United States Patent
Herz

(10) Patent No.: US 6,407,779 B1
(45) Date of Patent: Jun. 18, 2002

(54) METHOD AND APPARATUS FOR AN INTUITIVE UNIVERSAL REMOTE CONTROL SYSTEM

(75) Inventor: William S. Herz, Hayward, CA (US)

(73) Assignee: Zilog, Inc., San Jose, CA (US)

( * ) Notice: Subject to any disclaimer, the term of this patent is extended or adjusted under 35 U.S.C. 154(b) by 0 days.

(21) Appl. No.: 09/277,887

(22) Filed: Mar. 29, 1999

(51) Int. Cl.[7] .............. H04N 5/44; H04L 17/02; G08G 19/00
(52) U.S. Cl. .............. 348/734; 348/906; 341/176; 341/175; 340/825.69; 340/825.72
(58) Field of Search .............. 348/734, 906; 345/179, 173, 158, 169; 341/176, 175; 340/825.69, 825.72, 825.49, 825.25, 825.56, 825.17, 825.22, 825.24

(56) References Cited

U.S. PATENT DOCUMENTS

| | | | |
|---|---|---|---|
| 4,866,522 A | | 9/1989 | Beckley |
| 4,872,195 A | | 10/1989 | Leonard |
| 4,959,810 A | * | 9/1990 | Darbee et al. .............. 364/900 |
| 5,199,080 A | | 3/1993 | Kimura et al. |
| 5,267,323 A | | 11/1993 | Kimura |
| 5,282,028 A | * | 1/1994 | Johnson .............. 358/86 |
| 5,287,224 A | | 2/1994 | Tsuchiya et al. |
| 5,371,901 A | | 12/1994 | Reed et al. |
| 5,410,326 A | * | 4/1995 | Goldstein .............. 348/134 |
| 5,455,560 A | | 10/1995 | Owen |
| 5,455,570 A | * | 10/1995 | Cook et al. .............. 340/825.22 |
| 5,500,691 A | * | 3/1996 | Martin et al. .............. 348/734 |
| 5,506,717 A | | 4/1996 | Kho |
| 5,523,794 A | | 6/1996 | Mankovitz et al. |
| 5,545,857 A | * | 8/1996 | Lee et al. .............. 178/18 |
| 5,598,143 A | | 1/1997 | Wentz |
| 5,619,274 A | | 4/1997 | Roop et al. |
| 5,646,608 A | * | 7/1997 | Shintani .............. 340/825.52 |
| 5,699,124 A | | 12/1997 | Nuber et al. |
| 5,802,467 A | | 9/1998 | Salazar et al. |
| 5,898,398 A | * | 4/1999 | Kumai .............. 341/176 |
| 5,898,919 A | * | 4/1999 | Yuen .............. 455/420 |
| 5,903,259 A | * | 5/1999 | Brusky et al. .............. 345/168 |
| 5,952,936 A | * | 9/1999 | Enomoto .............. 340/825.69 |
| 5,956,025 A | * | 9/1999 | Goulden et al. .............. 345/327 |
| 6,040,829 A | * | 3/2000 | Croy et al. .............. 345/327 |
| 6,052,155 A | * | 4/2000 | Cherrick et al. .............. 348/565 |
| 6,097,441 A | * | 8/2000 | Allport .............. 348/552 |
| 6,104,334 A | * | 8/2000 | Allport .............. 341/175 |
| 6,130,726 A | * | 10/2000 | Darbee et al. .............. 348/734 |
| 6,211,856 B1 | * | 4/2001 | Choi et al. .............. 345/130 |

FOREIGN PATENT DOCUMENTS

EP  05037873  2/1993

OTHER PUBLICATIONS

PCT—International Search Report—dated Oct. 23, 2000.
Written Opinion—International appln. No. PCT/US00/04407.

* cited by examiner

Primary Examiner—John W. Miller
Assistant Examiner—Paulos Natnael
(74) Attorney, Agent, or Firm—Skjerven Morrill MacPherson LLP

(57) ABSTRACT

The present invention discloses a novel universal remote control system. Specifically, the remote control system according to the present invention provides the following features: bidirectional communications between the remote control and at least one of the audio/video devices; dual communication mode; automatic communication mode selection; loading and processing electronic program guide in the remote control; soft graphical user interface in the remote control; expanding the television set functions by the remote control; calibration handshake between the remote control and the audio/video device; updating the remote control; lost beacon signal in the remote control; handwriting recognition mechanism, and voice recognition mechanism in the remote control.

23 Claims, 16 Drawing Sheets

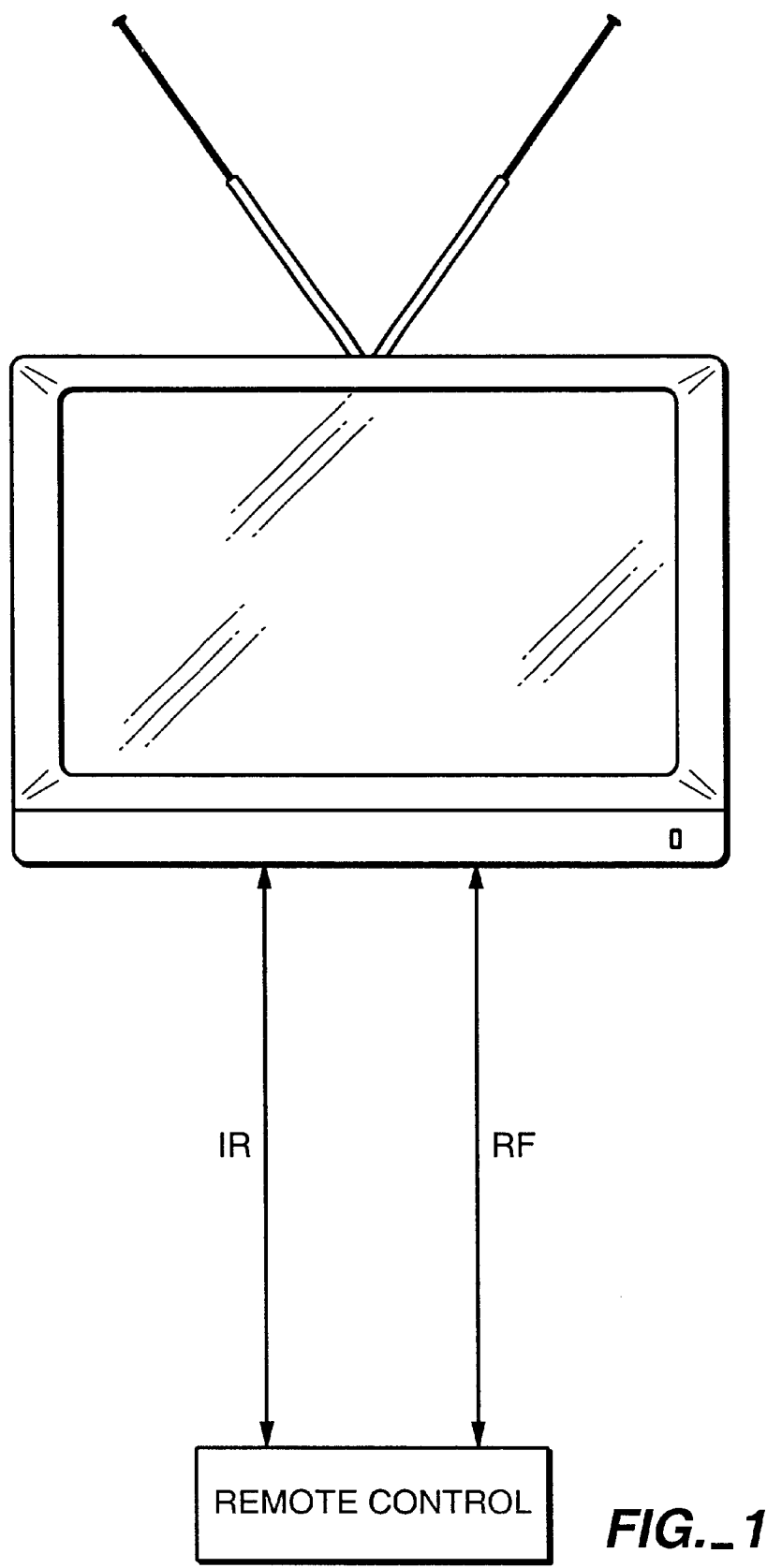
FIG._1

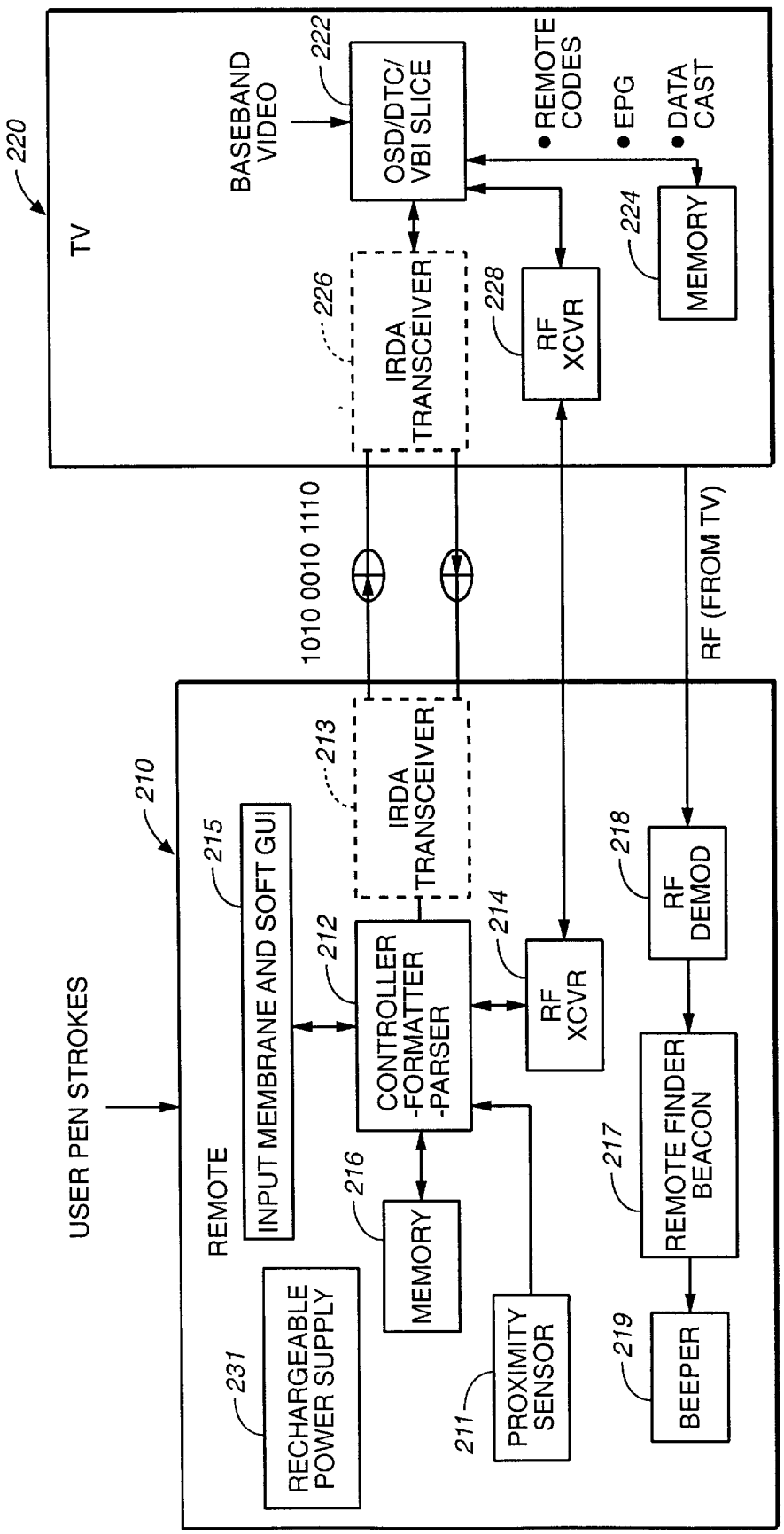
FIG._2

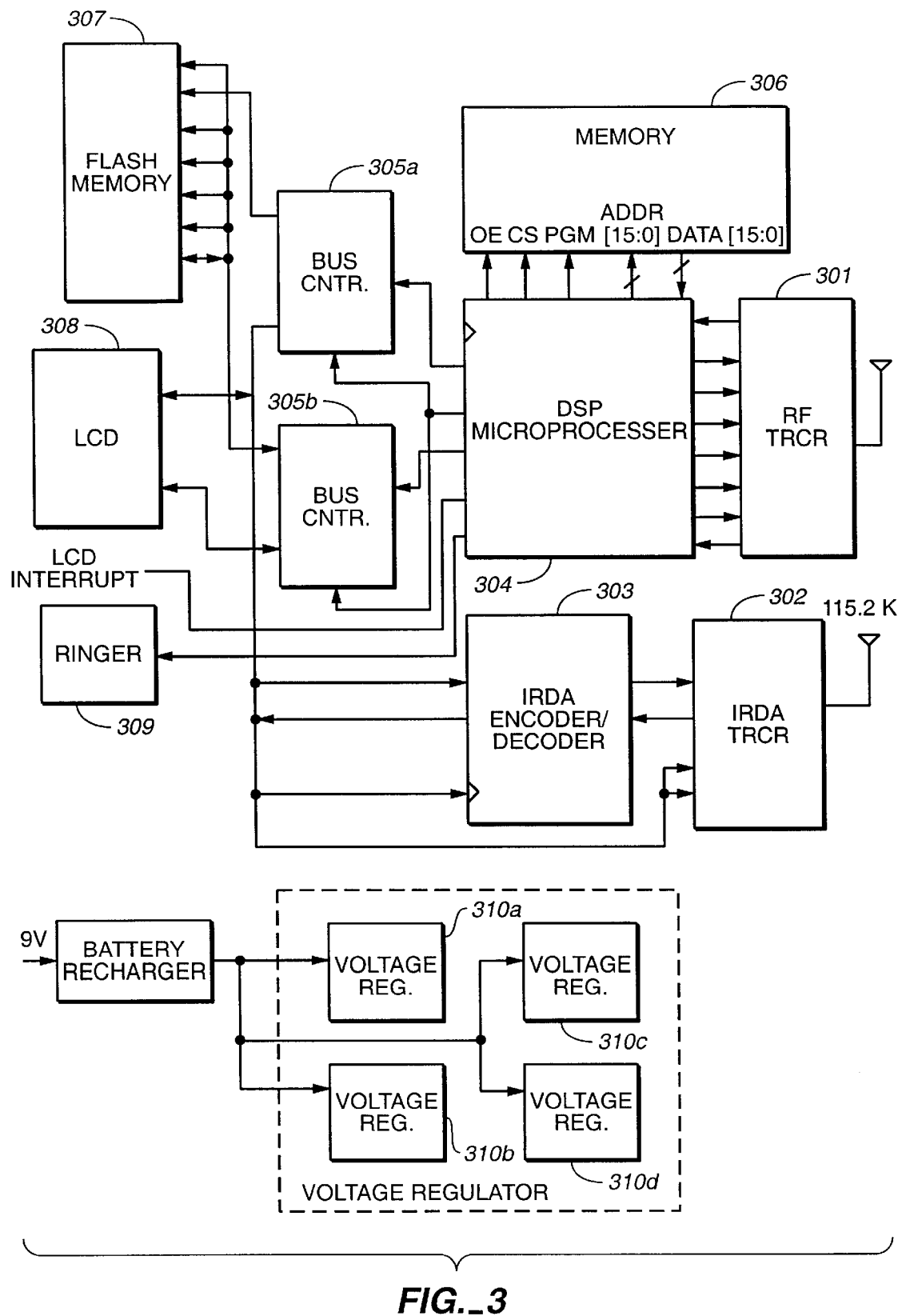
FIG._3

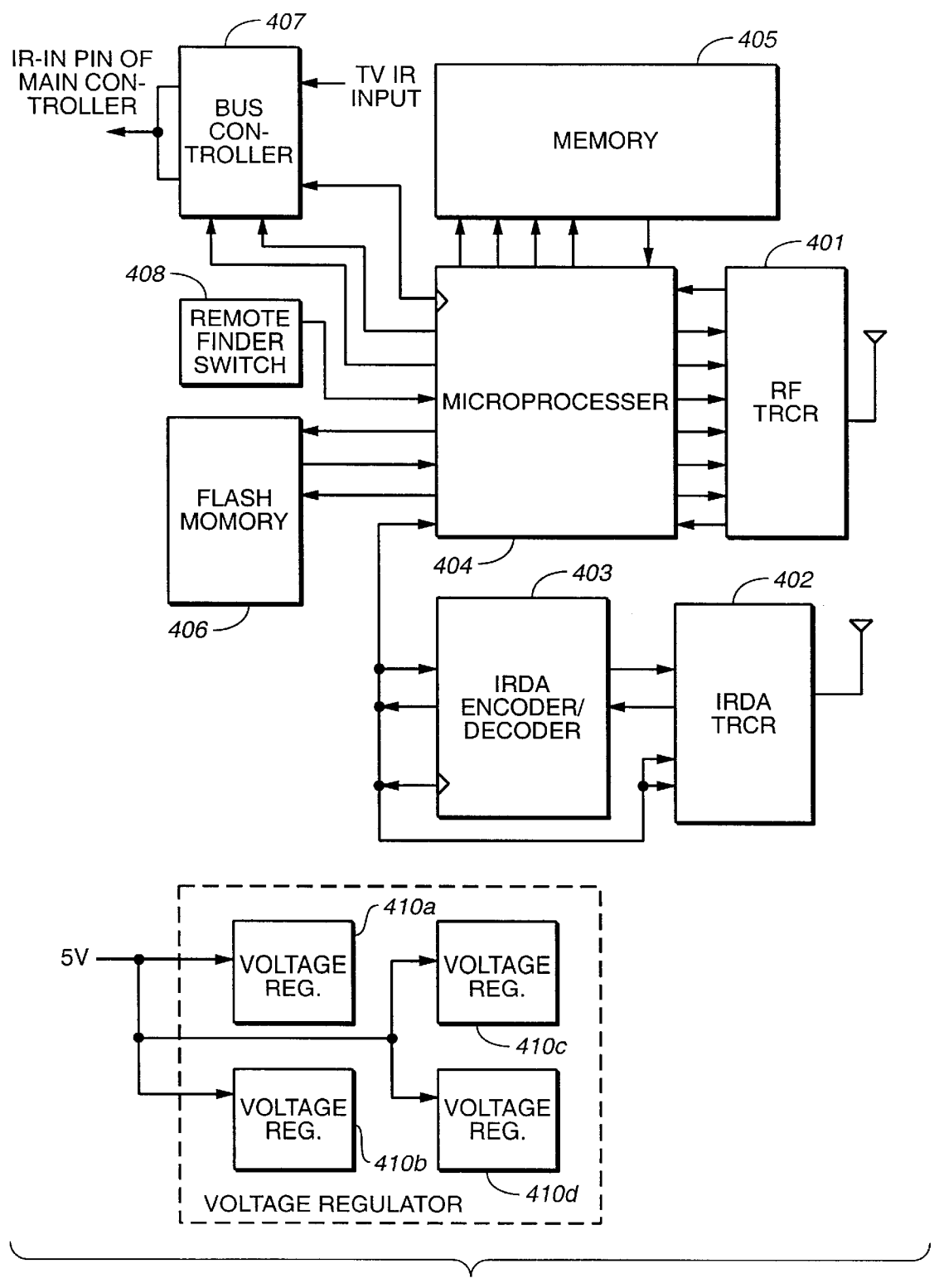
FIG._4

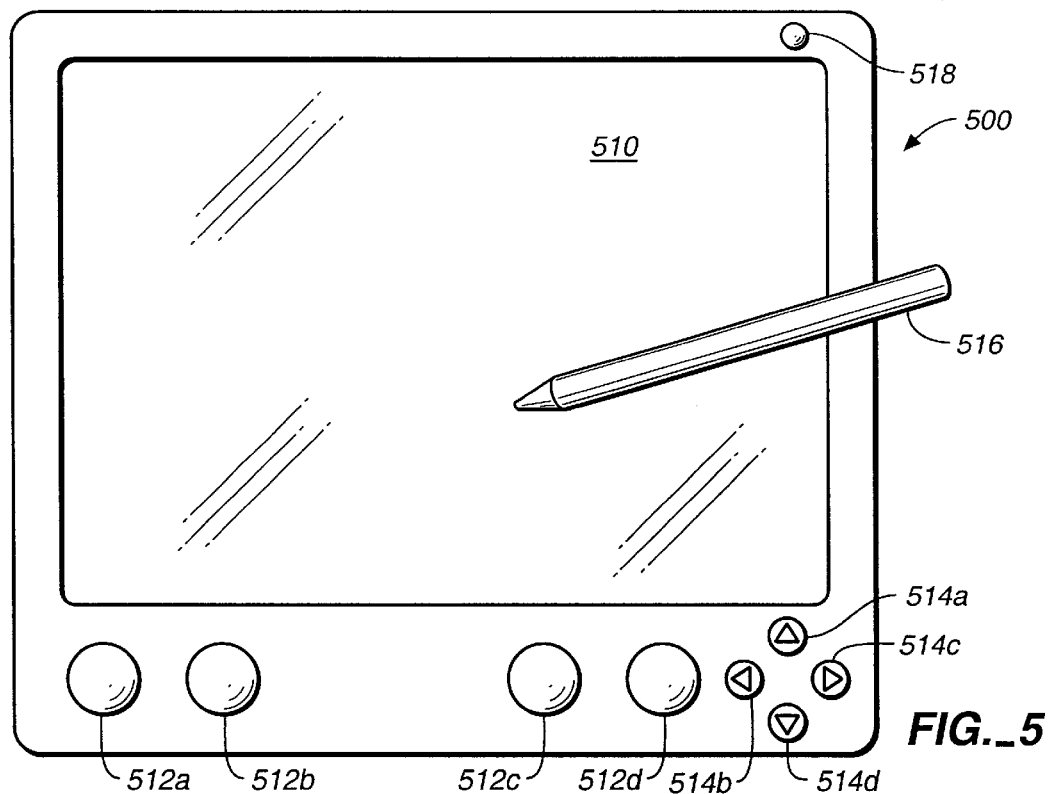
FIG._5
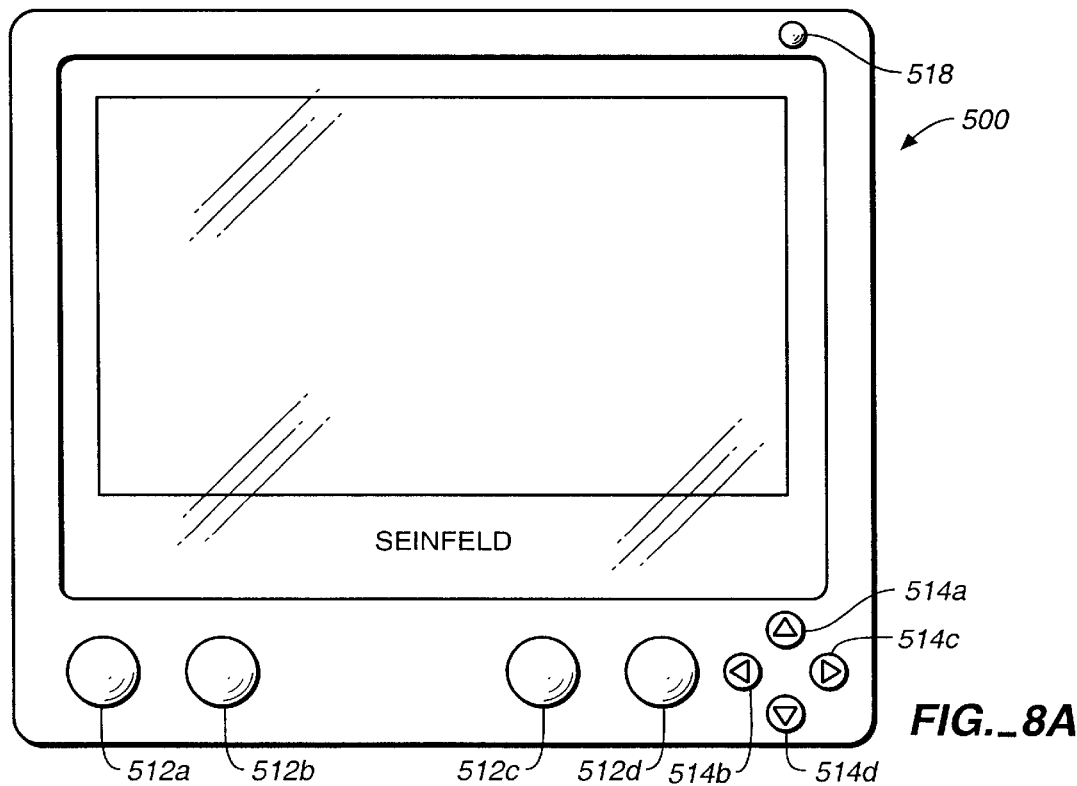
FIG._8A

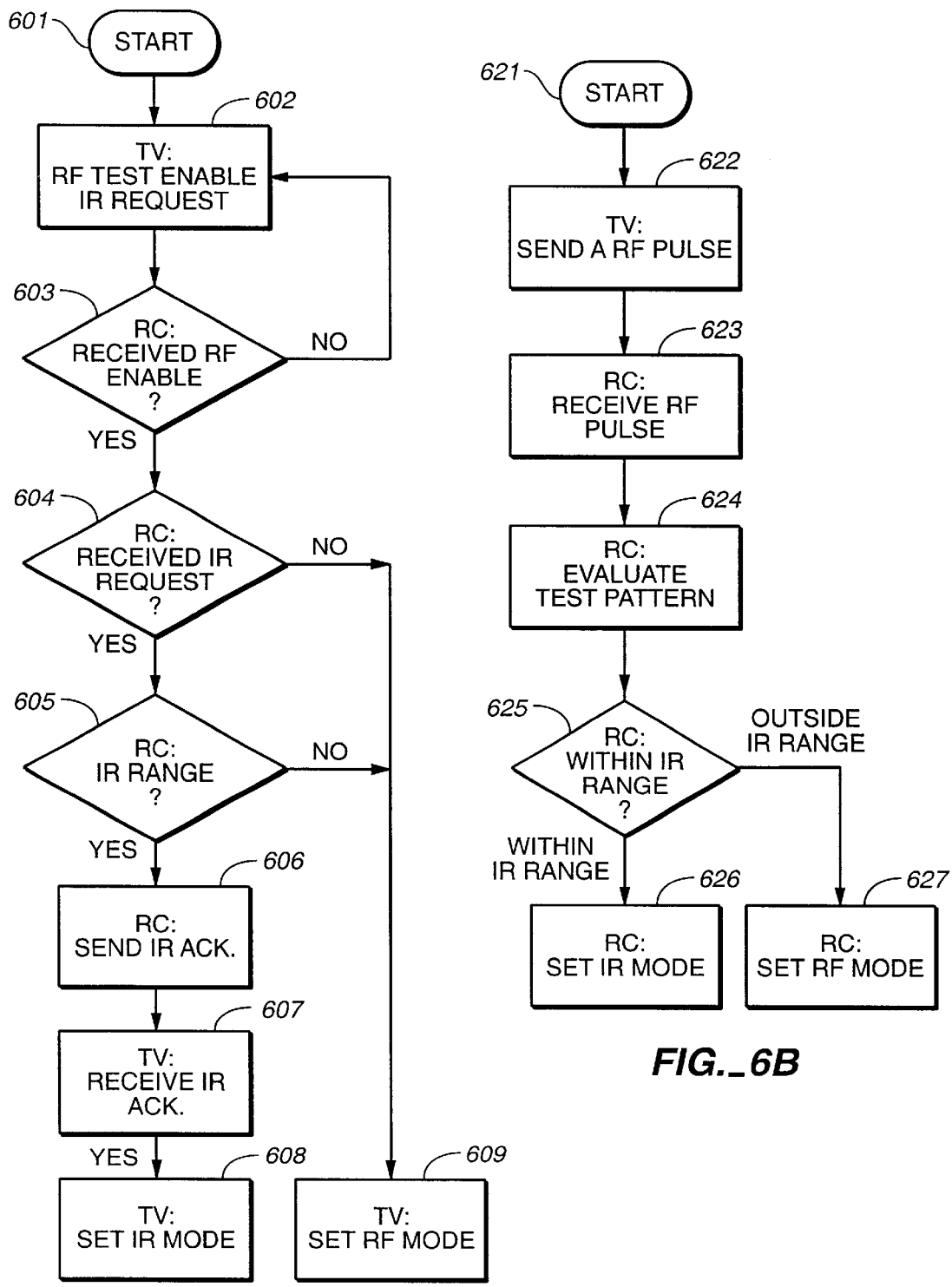
FIG._6A
FIG._6B

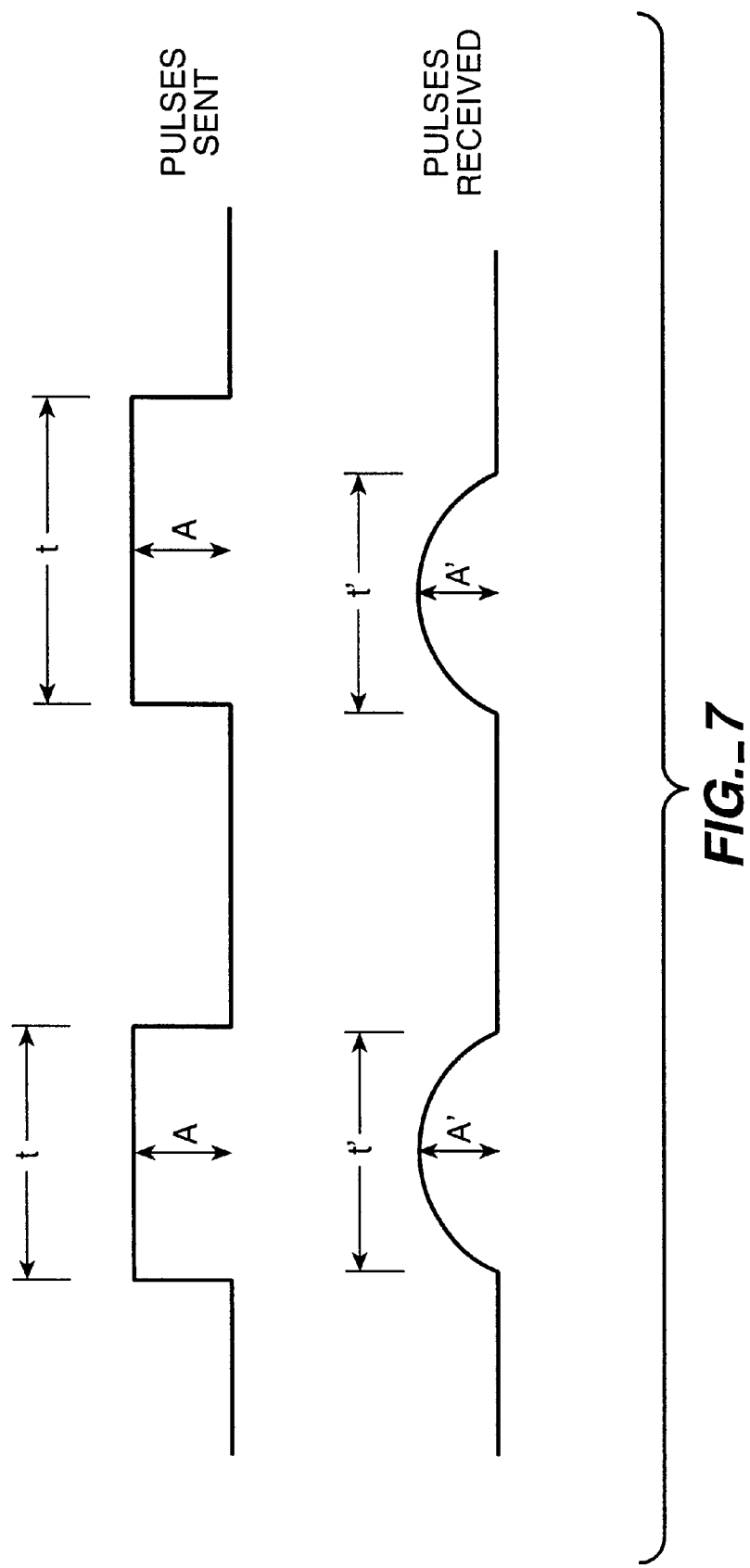
FIG._7

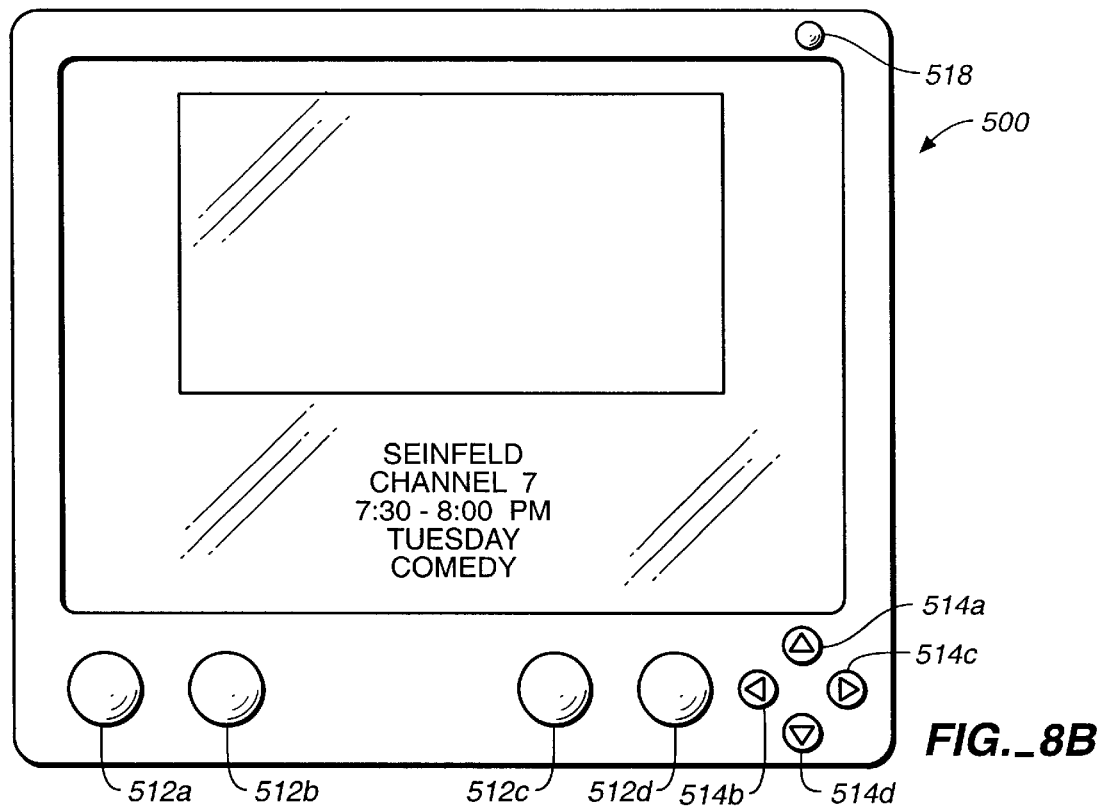
FIG._8B
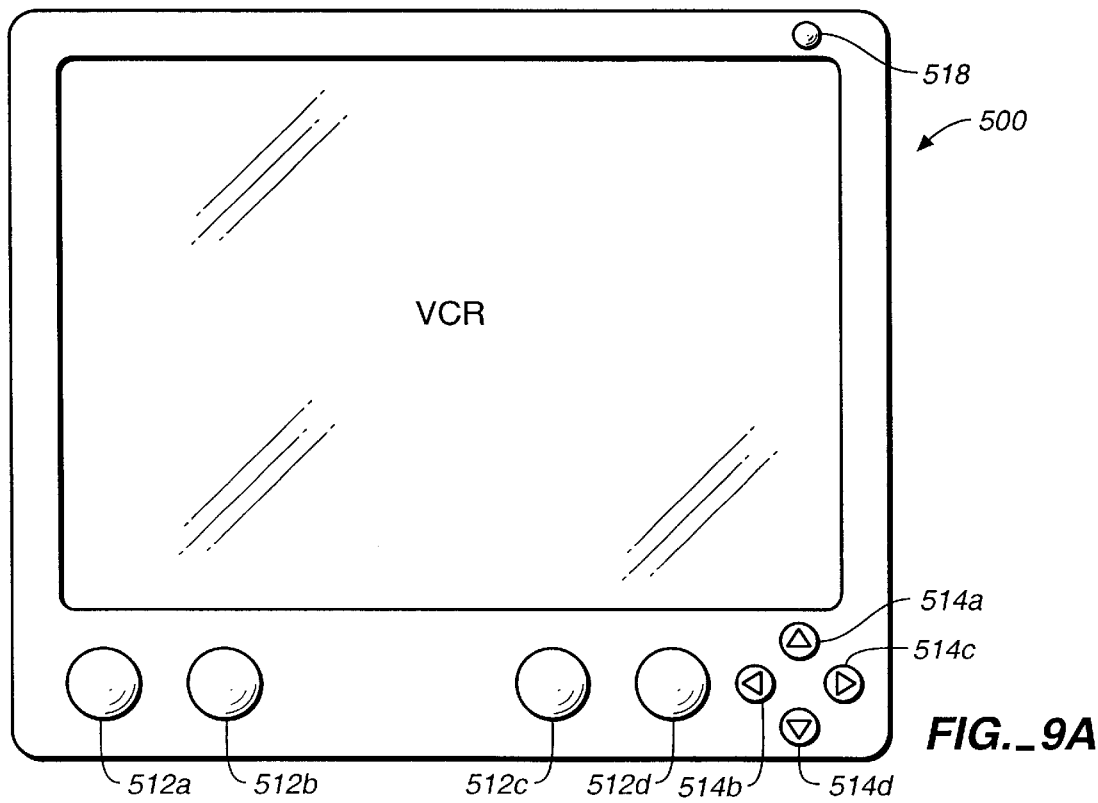
FIG._9A

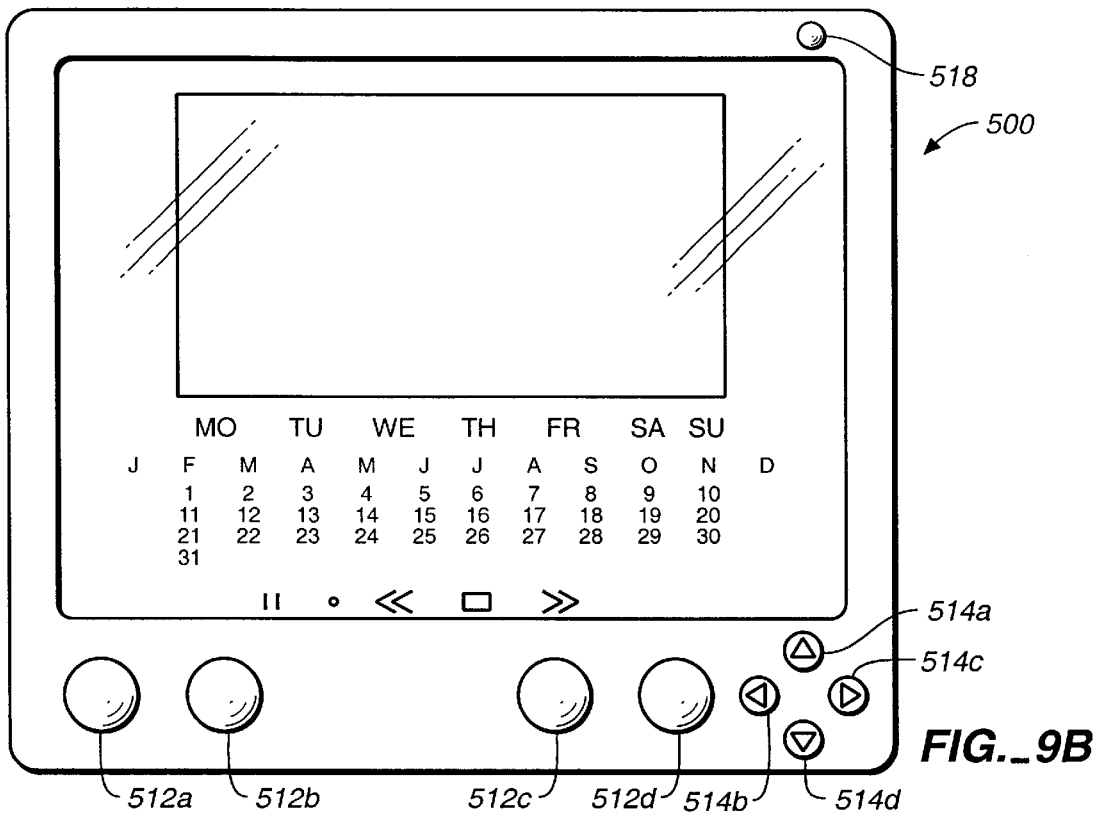
FIG._9B
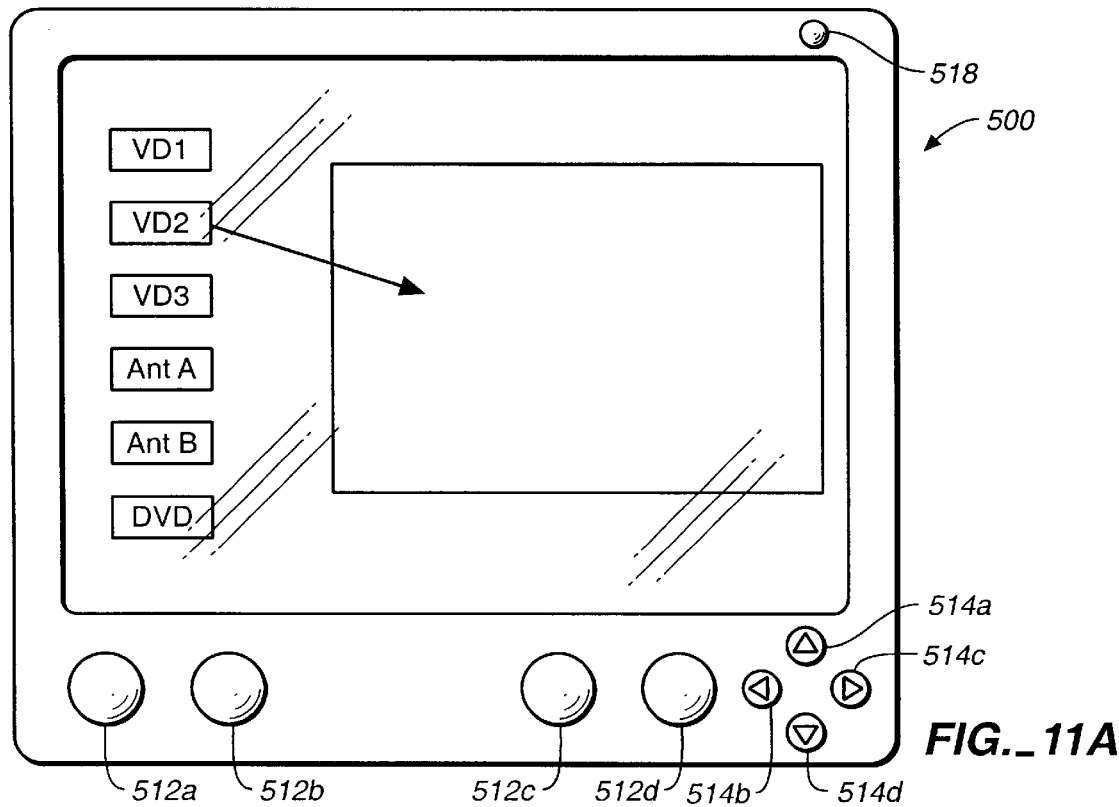
FIG._11A

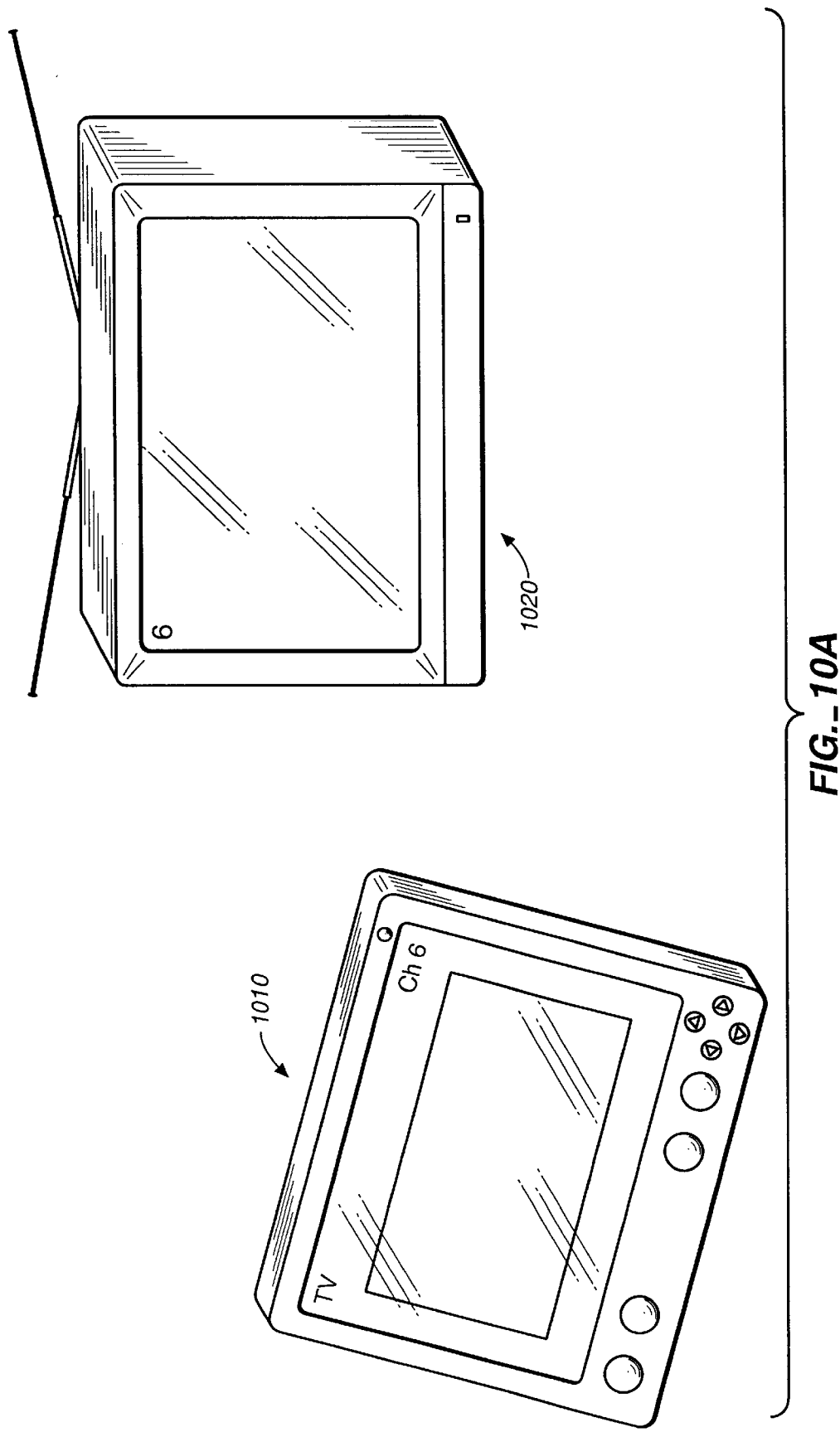
FIG._10A

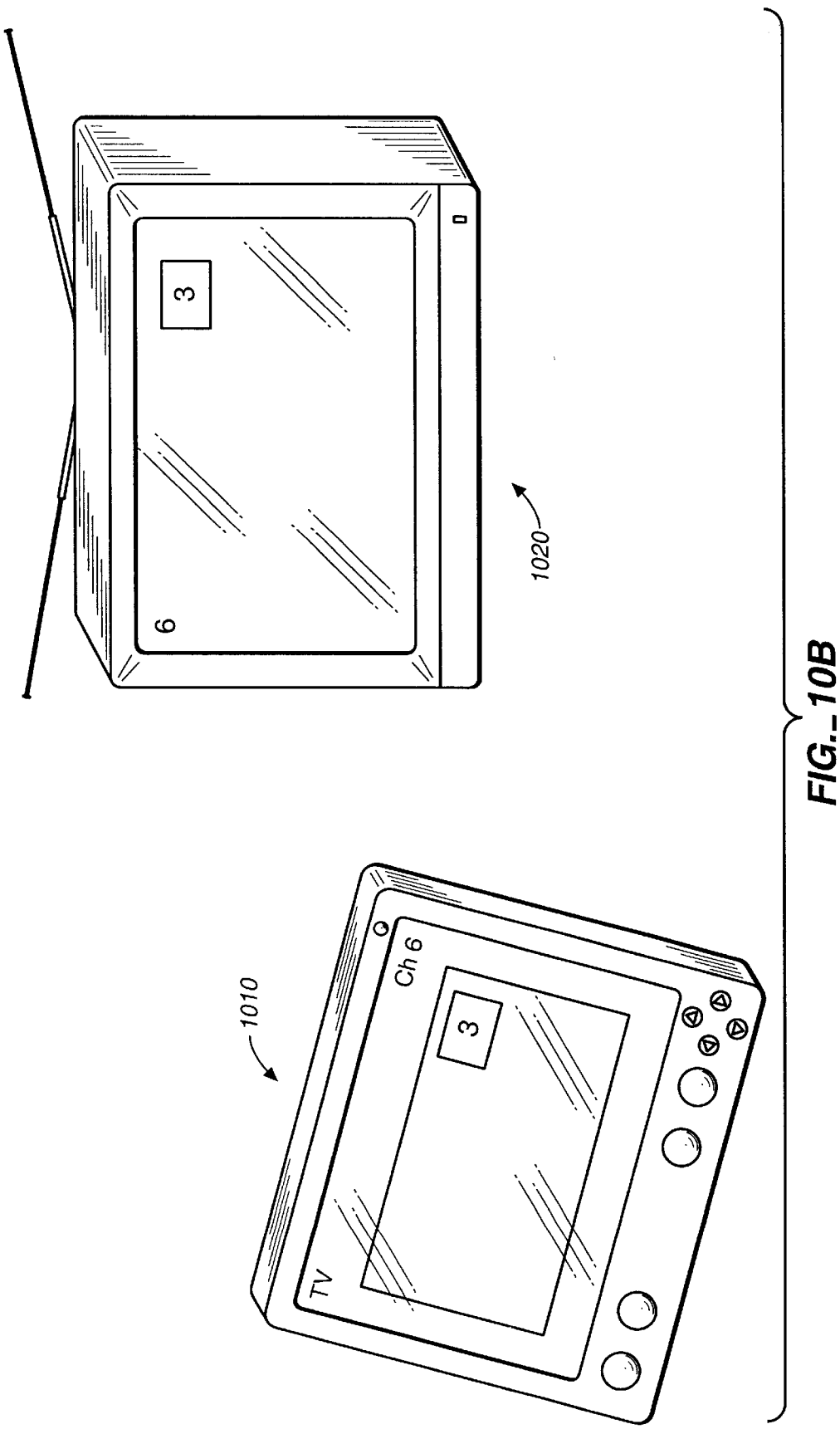
FIG._10B

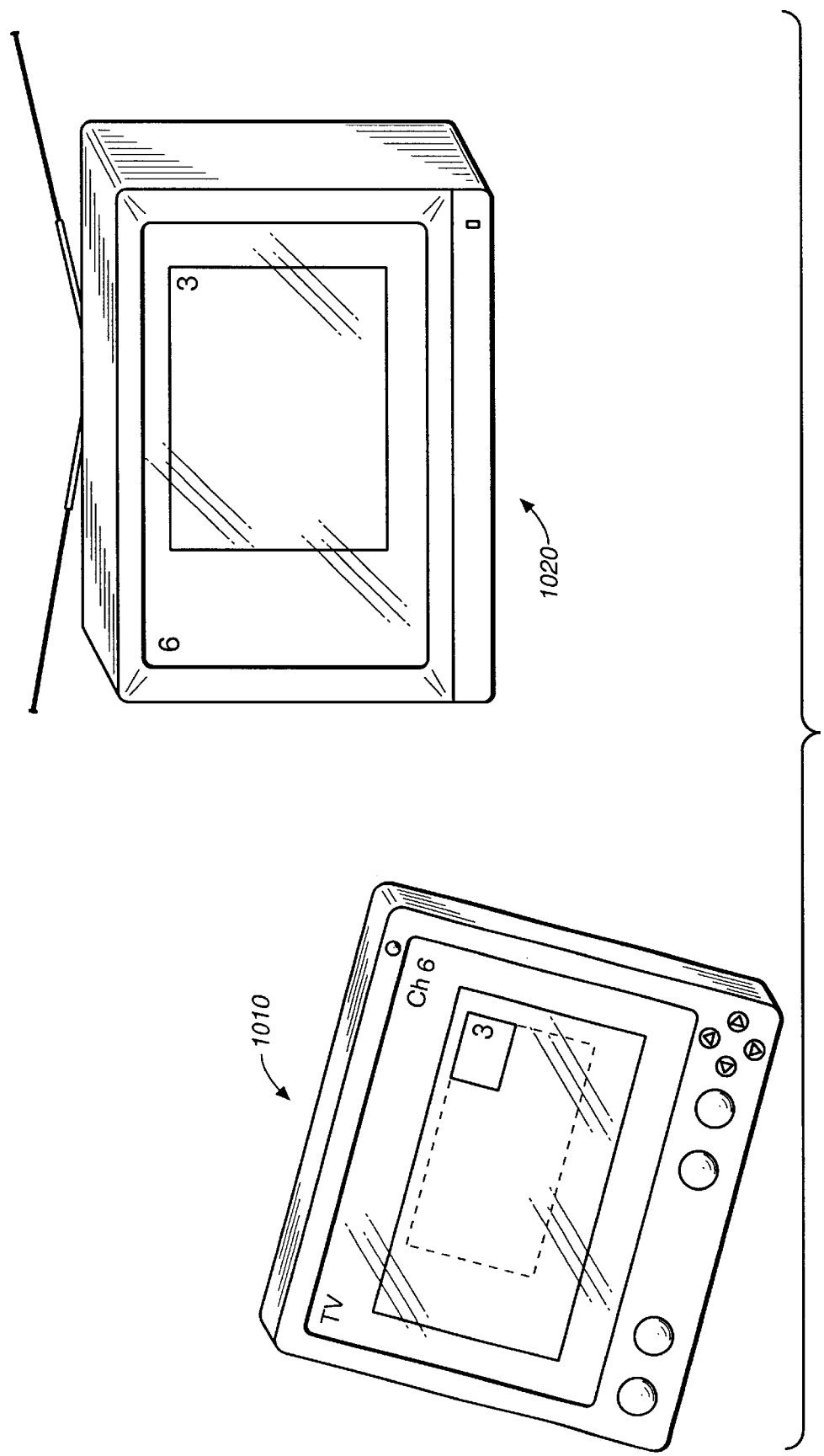
FIG._10C

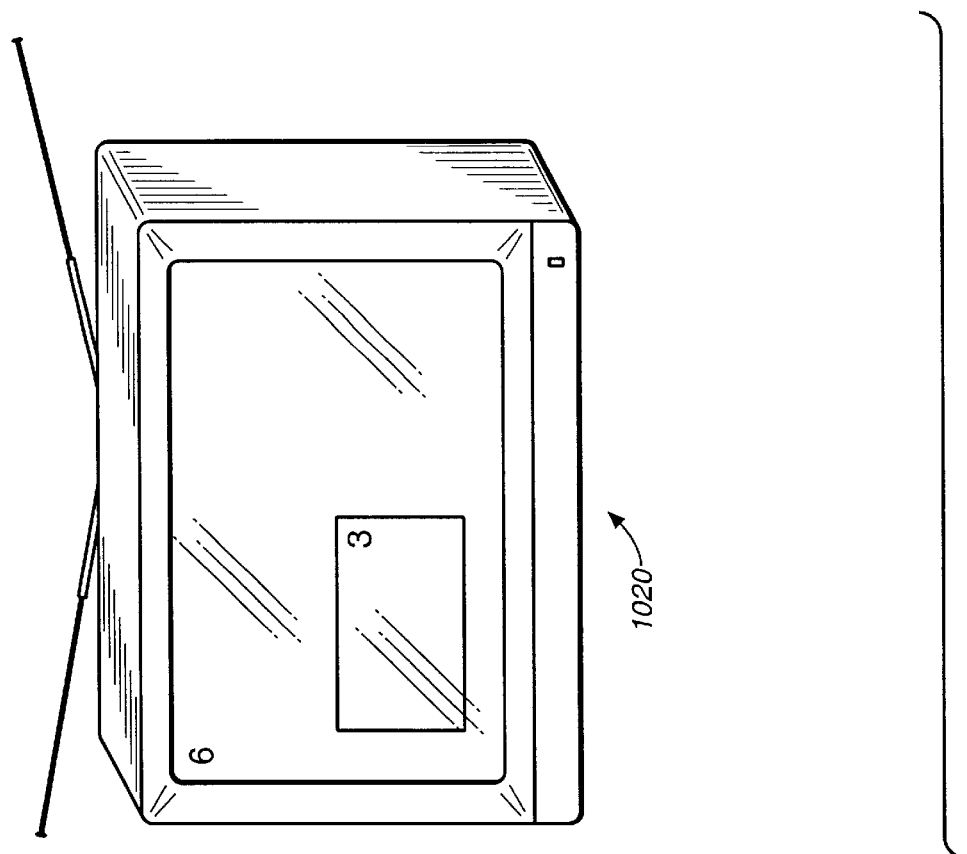
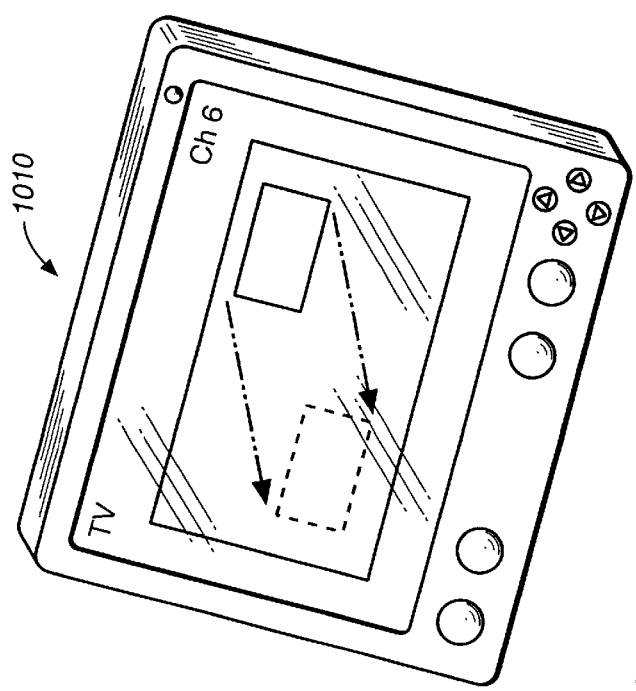
FIG._10D

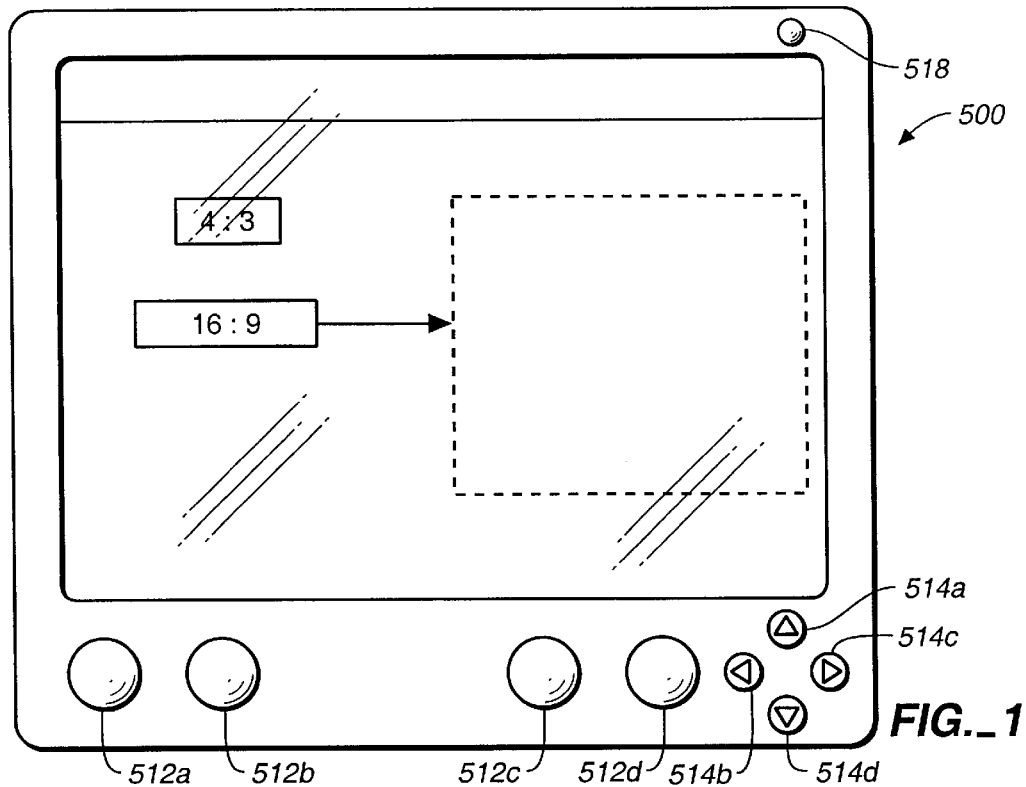
FIG._11B
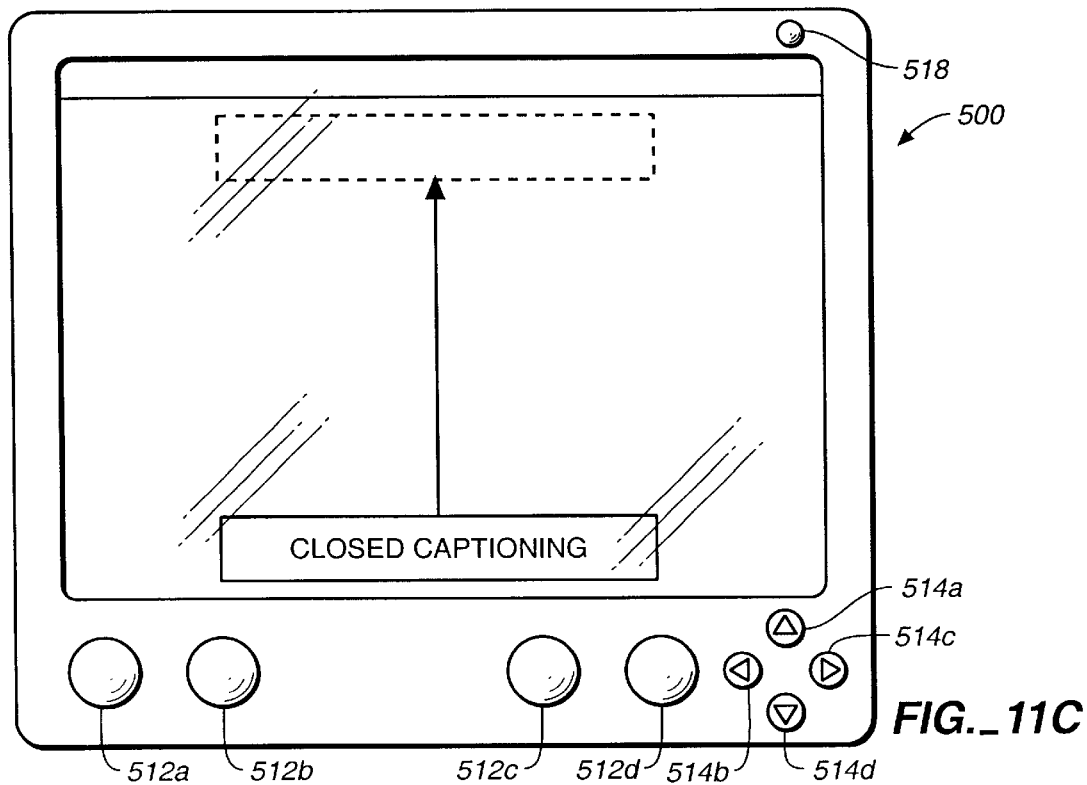
FIG._11C

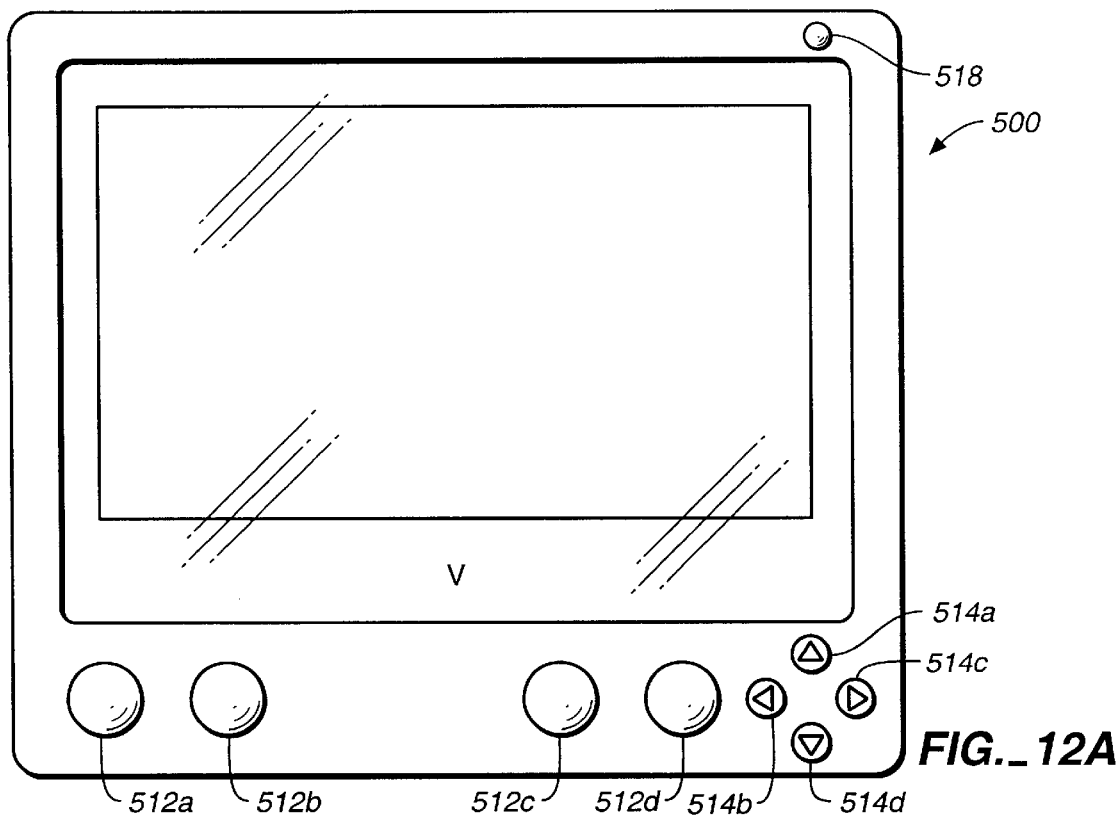
FIG._12A
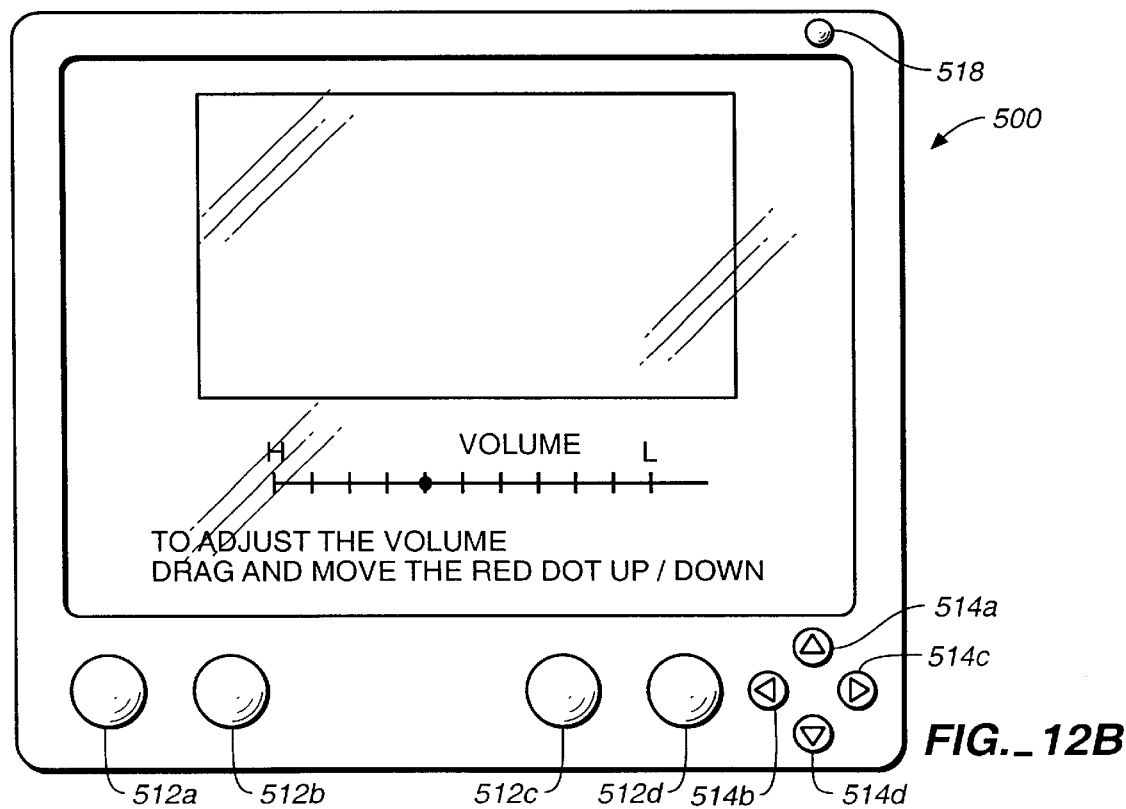
FIG._12B

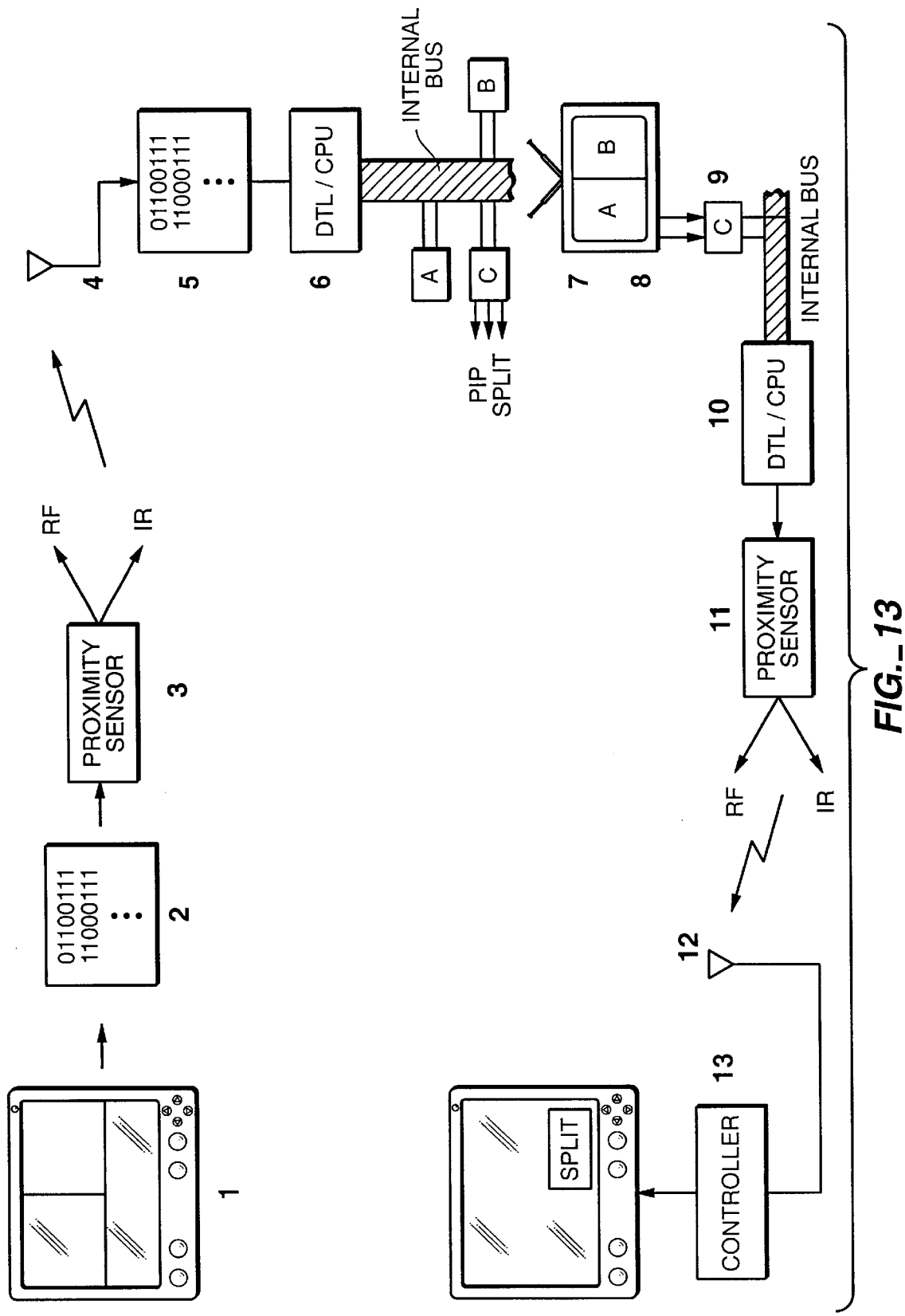
FIG._13

METHOD AND APPARATUS FOR AN INTUITIVE UNIVERSAL REMOTE CONTROL SYSTEM

BACKGROUND OF THE INVENTION

The present invention relates to a remote control system for remotely controlling various electronic devices such as television and audio visual ("AV") systems using a single remote control.

In recent years, various electronic devices such as stereo systems, television receivers, cassette tape decks, video tape decks, compact disc players, laser vision disc players, and the like are equipped with remote control systems.

In a conventional system, a remote control system having a transmitter is usually positioned remotely from a controlled device. The transmitter, when operated, transmits a remote control signal, such as an infrared remote control signal, which is received by a receiver in the controlled device. The received remote control signal is decoded to control the device as intended by the remote control signal.

In a universal remote control system, one single remote control is capable of controlling more than one AV device. In one type of the universal remote control, the remote control comprises a remote memory storing all the coding signals for different brands of the AV devices. Then the user programs the remote control by entering a set of preassigned codes to call up the appropriate coding of each device. In another type of the universal remote control, the user activates a learning mode of the remote control and lines up the universal remote control with the selected device. Then the remote control sequentially tests each control signal until the correct one is found. When the correct control signal is found, the device will signal the user to stop further testing and the corresponding control protocol is then stored.

SUMMARY OF THE INVENTION

It is an object of the present invention to provide a novel universal remote control system.

It is another object of the present invention to provide a remote control system having a bidirectional communication channel between the remote control and the audio video device(s) controlled by the remote control.

It is another object of the present invention to provide a remote control system having a dual communication mode for communication between the remote control and the audio video device(s) controlled by the remote control. Specifically, the remote control system accommodates both infrared communication and radio frequency communication.

It is another object of the present invention to provide a remote control system that is capable of automatically switching between a plurality of communication modes.

It is another object of the present invention to provide a remote control system that is capable of storing and updating TV programming guide information in a remote control memory.

It is another object of the present invention to provide a novel user interface for the remote control in the remote control system.

It is another object of the present invention to provide a soft graphical user interface ("GUI") to the remote control of the remote control system.

It is another object of the present invention to provide a remote control system that allows expansion of the television functions that it controls.

It is another object of the present invention to provide a novel calibration handshake method for communications between the remote control and at least one audio/video device.

It is another object of the present invention to provide a remote control that is capable of automatically updating the remote control memory with universal remote protocols associated with new home entertainment devices.

It is another object of the present invention to provide a lost beacon feature for the remote control, wherein the user can activate a beacon signal when the remote is misplaced.

It is another object of the present invention to provide a handwriting recognition input or voice recognition feature as the user interface for the remote control.

Additional objects, features and advantages of various aspects of the present invention will become apparent from the following description of its preferred embodiments, which description should be taken in conjunction with the accompanying drawings.

BRIEF DESCRIPTION OF THE DRAWINGS

FIG. 1 shows a preferred embodiment of a conceptual diagram of a universal remote control system according to the present invention.

FIG. 2 shows a block diagram of a remote control system of a preferred embodiment according to the present invention.

FIG. 3 shows a preferred embodiment of a remote control block of the remote control system of FIG. 2.

FIG. 4 shows a preferred embodiment of a television block or the remote control system of FIG. 2.

FIG. 5 shows a preferred embodiment of a remote control according to the present invention.

FIGS. 6a and 6b are flow charts of two preferred methods of communication mode selection according to the present invention.

FIG. 7 shows a sequence of square pulses used for mode selection as shown in the flow chart of FIG. 6b.

FIGS. 8a,b illustrate how EPG programming data can be used in a remote control of a preferred embodiment according to the present invention.

FIGS. 9a,b illustrate the soft GUI displayed on a remote control of a preferred embodiment according to the present invention.

FIGS. 10a,b,c,d illustrate the ability to expand the TV functions according to the present invention.

FIGS. 11a,b and c illustrate the calibration handshake ability according to the present invention.

DETAILED DESCRIPTION OF THE DRAWINGS

FIG. 1 shows a preferred embodiment of a conceptual diagram of a universal remote control system according to the present invention. In the preferred embodiment as shown, the universal remote control system comprises a remote control 110 and a television set 120. In another embodiment not shown, the television set can be substituted with a set top box connected to a television set. In addition, as in the universal remote control systems available on the market, the remote control of the present invention can also be used for controlling other AV devices such as videocassette recorder ("VCR"), stereo system, and digital versatile disc ("DVD") components, etc. By encoding the signals sent out by the remote control, the remote control is able to establish communication channel between the remote control and the television set or other AV devices. In the preferred embodiment of the present invention, the communication channel established between the remote control and any of the devices connected is a bi-directional communication channel so that data and information can be transmitted to and from the remote control to each of the components in the remote control system.

FIG. 2 shows a block diagram of a remote control system of a preferred embodiment according to the present invention. As shown in the figure, the system as shown only comprises a remote control block 210 and a television set block 220. It should be noted also, as stated in the previous paragraphs, the present invention can be applied to other audio/video devices.

The television set block 220 of the preferred embodiment comprises a video signal receiver 222 for receiving and processing radio frequency or baseband video data; a memory 224 for storing any information needed for the television set and the remote control; an infrared communicator 226 for providing a infrared communication with the remote control; and a radio frequency communicator 228 for providing a radio frequency communication with the remote control. In the preferred embodiment as shown, the selection between these two communication modes (i.e. infrared and radio frequency) is performed and determined by a proximity sensor 211 and a microcontroller 212 located in the remote control block 210 as shown.

As shown in FIG. 2, the remote control block 210 comprises an infrared communicator 213 for communicating with the television set; a radio frequency communicator 214 for communicating with the television set; a microcontroller 212 for controlling the basic functions of the remote control; a user interface mechanism 215 for inputting and displaying data; a remote control memory 216 for storing information (e.g. programming guide information); a proximity sensor 211 connected to the microcontroller 212 for facilitating the microcontroller 212 to select a communication mode between the remote control 210 and the television set 220; a remote finder beacon mechanism comprising a radio frequency demodulator 218 connected to a remote finder beacon 217 and a beeper 219 for receiving beacon signal from the television set 220 for locating the remote control 210; a voice recognition mechanism (not shown) for processing voice commands issued by the user; and a power supply 231 for providing rechargeable and non-interruptible power to the remote control.

In the preferred embodiment as shown, the microcontroller 212 of the remote control controls all major functions, such as: (1) handling user commands received by the user interface 215, and generates control signals and transmits the control signals to the television set 220, or any other AV devices by one of the two transceivers; (2) processing electronic program guide ("EPG") data received from the television set and storing the EPG data in the remote control memory 216; (3) parsing, retrieving, and displaying the processed EPG data from the memory 216 as requested by the user through the use of the user interface 215; (4) updating the stored EPG data and communication protocol(s) received from the television set 220, or any other audio/video devices; (5) selecting the optimal communication mode between the infrared communication mode and the radio frequency communication mode in response to the proximity sensor 211; and (6) analyzing and responding to user commands received from the user interface 215 and performing the appropriate functions, etc.

FIG. 3 is a block diagram showing additional details of the remote control portion of the remote control system according to the present invention. The remote control portion as shown comprises a radio frequency transceiver 301, a IRDA transceiver 302 and IRDA encoder/decoder 303 pair supporting IRDA standard, a DSP microcontroller 304 for controlling different components within the remote control block, a pair of bus controllers 305a,305b for controlling data transfer within the remote control block, a remote control memory 306 for storing the remote control system program and a handwriting recognition program, a nonvolatile flash memory 307 for storing the EPG data or universal remote control protocol(s) downloaded from the television set or a set-top box, a touch screen LCD device 308 for data and/or command entry, a ringer 309 for producing a beacon or activating a flashing LED when a remote control finding signal is received. In addition, the remote control also comprises four voltage regulators 310a,310b, 310c,310d. Two of the voltage regulators are used to supply currents to the IRDA encoder/decoder 303 and the IRDA receiver 302, and the remaining two voltage regulators are used to supply currents to all other components on the remote control. In the preferred embodiment as shown, the remote control is powered by a rechargeable battery. It should be noted that the IRDA standard is used for the infrared communication in this preferred embodiment of the present invention. The IRDA standard is a cordless data connection standard using infrared light. It is a low-cost transceiver signaling technology for two way data exchange. It provides high-speed digital exchange through the typical PC UART/serial port at 9600-115200 bits/s, and in some units compatible high speed extensions up to 1 Mb/s and 4 Mb/s speeds.

FIG. 4 is a block diagram showing additional details of the television portion of the remote control according to the present invention. As shown in the figure, the television portion comprises a radio frequency transceiver 401, a IRDA transceiver 402 and IRDA encoder/decoder 403 pair supporting IRDA standard, a microcontroller 404 for controlling various components within the television portion, a remote control memory 405 for storing a remote control system program, a flash memory 406 for storing the EPG data downloaded from the cable company, satellite, pre-recorded cassettes, or DVD, etc., a bus controller 407 for controlling data transfer within the television portion, and a remote finder switch 408 for the user to activate the remote finding feature. Similarly, as in the remote control portion, the television portion also comprises four voltage regulators 410a,410b,410c,410d for providing currents to different components of the television portion.

FIG. 5 shows a preferred embodiment of a remote control 500 according to the present invention. The remote control as shown comprises a display screen 510 for interfacing with the user; a plurality of buttons 512a,b,c,d & 514a,b,c,d for issuing commands and/or entering data into the remote control 500; a stylus 516 for writing onto the screen 510 and a LED light 518 for indicating the communication mode currently running between the remote control and the device connected. As shown in the figure, the plurality of buttons comprises a group of four buttons 514a,b,c,d for moving any pointing device used in the display screen 510. In addition, the display screen 510 of the preferred embodiment is connected to a handwriting recognition mechanism (not shown) so that the user can issue commands and/or enter data to the remote control 500 by writing onto the screen 510. It should be noted that, even with the disclosure of this embodiment, many aspects of the present invention can still be implemented in a universal remote control that does not provide the display 510 as used by this embodiment. In other words, other kinds of user interface such as keyboard and push buttons can also be employed in the present invention. In addition, the remote control according to the present invention is backward compatible with the current remote control system such that all the current remote control functionality can be emulated by the present invention.

In another preferred embodiment according to the present invention, the touch screen display is also provided with pressure sensing ability for sensing different handwriting stroke pressures exerted on the screen. For example, instead of clicking a new command button on the emulated screen, a hard pressed period can be programmed in the remote control for the beginning of a new command.

In another preferred embodiment, instead of using a display screen in the remote control to interface with the user, a touch pad can be used along with an on-screen display ("OSD") of the television to perform similar functions. Specifically, the user can enter the commands/data on the touch pad of the remote control and the corresponding graphical user interface can be shown on the OSD of the television. In other words, the command/data inputting functions of the display screen of the remote control is replaced by the touch pad whereas the graphical user interface functions of the display screen is replaced by the OSD of the television. By replacing the display screen with the touch pad, the cost of the remote control can be tremendously reduced. In the following discussions, it should be noted that each and every feature using the display screen of the remote control can be replaced by using a touch pad along with the OSD of the television.

The followings discuss different aspects of the remote control of the present invention.

1. Bidirectional Communications

The first aspect of the present invention relates to the means of communication between the remote control and the television set/set top box (and any other audio/video devices). As discussed above, the communication between the remote control and the television is preferably performed bidirectionally so that commands and data can be transferred freely between the remote control and the television set. Thus, in addition to commands and data being sent from the remote control to the television set, commands and data can be sent back from the television set to the remote control. In the preferred embodiment, the communication is performed by transceivers located in the remote control and the television set. Particularly, each transceiver comprises both a transmitter and a receiver for sending and receiving data. This bi-directional communication feature of the present invention provides extreme flexibility in the remote control design because the remote control not only can control the television set, the television set can also provide data and control signals back to the remote control in response to changes in status and/or protocols.

In one example of the present invention, the television set can forward the EPG programming data received from satellite delivery or terrestrial broadcast to the remote control. The television set first receives the EPG data, and then forwards the data to the remote control via the bidirectional communication feature as discussed. By having the EPG programming data stored in the remote control memory, the remote control is able to parse and retrieve the EPG programming data when a user command is entered. Then the remote control can interpret the TV programming data and process the command entered, and simplify the control of the corresponding AV component(s) accordingly. Detailed examples on the uses of the TV programming data are illustrated in the following sections. Particularly, section (4) (i.e. EPG Programming Data section) discloses methods of downloading the electronic programming guide (i.e. EPG programming data) to the remote control, and then subsequent using the EPG programming data stored in the remote control to handle any commands entered. In addition, using the bidirectional communication channel, the television set can also inform and update the remote control of its status and/or any new control protocols. These features will be discussed in detail in the following sections.

2. Infrared/Radio Frequency Communication

According to another aspect of the present invention, there is provided a dual communication mode for the remote control system. Specifically, the television/set top box (or any other audio/video devices) and the universal remote control of the present invention each comprises an infrared transceiver and a radio frequency transceiver so that the communication between the two devices can be performed in either the infrared or radio frequency band. Furthermore, each of these transceivers can be a bi-directional transmitting device as discussed in the previous paragraphs.

Particularly, in response to the environment and distance between the remote control and the television set, the present remote control system automatically selects an optimal communication means (i.e. infrared communication, or radio frequency communication). It is known that each of the infrared communication and the radio frequency communication modes has its own advantages and shortcomings. Therefore, the present invention is designed to alleviate the disadvantages of each means, by automatically selecting the most efficient communication method between the remote control and the television set.

Specifically, in the preferred embodiment of the present invention, when the remote control is in close proximity of the television set, the infrared communication mode is selected in order to conserve power in the remote control. It should be pointed out that, by communicating using infrared signals (especially by complying with the IRDA standard), the remote control system of the present invention is able to conform to other IRDA devices such as computer peripherals, digital cameras, laptop computers, personal communication systems (PCS), and wireless modems and printers, etc. However, in some situations, infrared communication cannot be established due to the distance between the two devices, and/or some obstacles blocking the infrared transmission. In those cases, radio frequency transmission is then selected for communicating between the remote control and the television set (or other connected devices). It should be also noted that, in the preferred embodiment, the default communication mode of the remote control system is the infrared mode to conserve electrical energy of the remote control. Only if the infrared communication cannot be established between the remote control and the target device, the system will be shifted to the radio frequency communication mode.

Therefore, in the preferred embodiment as shown in FIG. 2, each of the remote control and the television set comprises an infrared transceiver and a radio frequency transceiver so that the remote control can communicate with the television in either the infrared mode or radio frequency mode. By having two different transceivers in the remote control and the television set, the remote control system can switch between these two communication modes according to need.

In one preferred embodiment of the present invention, a select button is provided in the remote control for the user to force and lock a specific communication method. This can be done by simply deactivating the proximity sensor. By deactivating the proximity sensor and forcing a communication mode on the remote control system, the user can select a preferred and/or fixed method of communication between the remote control and the television set.

3. Automatic Mode Selection

Another aspect of the present invention is a method to automatically select an optimal communication mode for communication between the remote control and the television set (or any other audio/video devices). Under this aspect of the present invention, the selection between the two communication modes (i.e. infrared mode and radio frequency mode) is transparent to the user and is performed automatically in the remote control system without requiring any attention from the user.

FIG. 6a is a flow chart showing one of the preferred methods of determining and selecting an optimal communication mode performed by the remote control system according to the present invention. At a first step (Step 601), both of the television and remote control are initialized to operate in both the radio frequency and IR mode. Then, in Step 602, the television set sends out both (1) a test enable signal; and (2) an IR request to the remote control. According to this embodiment, the test enable signal is sent by the television set using the radio frequency transceiver to inform the remote control of the incoming IR request. In the preferred embodiment, the test enable signal contains a sequence of pulses transmitted to the remote control for synchronization. In addition, the IR request is sent by the television set using the IR transceiver. In the preferred embodiment, the IR request is a predetermined sequence of data bits. When the remote control receives the test enable signal from the television (Step 603), it proceeds to the next step, Step 604. If the remote control does not receive the test enable signal, the remote control is out of the radio frequency range of the television set so that the television set will repeat the initialization process again. In the next step (Step 604), the remote control examines whether the IR request signal is received. If the remote control does not receive the IR request signal, the remote control will not transmit any response to the television set. On the other hand, after the remote control receives the IR request sequence of data bits, the remote control compares the received IR request sequence of data bits with a reference of the sequence of data bits stored in the remote control (Step 605). If the two sequences of data bits match, the remote control then sends an infrared acknowledgment back to the remote control (Step 606). On the other hand, if the two sequences of data bits do not match, the remote control will not send an acknowledgment sent to the television.

Finally, when the television receives the IR acknowledgment signal from the remote control (Step 607), the television will set the communication mode to the IR mode (Step 608). On the other hand, if the television does not receive any IR acknowledgment after a predetermined period of time, the television will determine that the infrared channel cannot be established and will select the radio frequency mode for communication between the television and the remote control (Step 609).

FIG. 6b is a flow chart showing another preferred method of selecting the mode for communications between the remote control and the television set. First, both the television set and the remote control are initialized to operate in the radio frequency mode (Step 621). In this preferred method, the television set only sends a sequence of square pulses using the radio frequency transceiver to the remote control for the initialization process (Step 622). As shown in FIG. 7, each of the square pulses has a predetermined amplitude A and time duration t. When the remote control receives the sequence of square pulses from the television set, the remote control compares an amplitude A' and time duration t' of individual square pulse received with a set of pre-stored values (i.e. A & t). By comparing the amplitude A' and time duration t' of the pulses received from the television set with the pre-stored values (i.e. A & t), the remote control can calculate the distance between the remote control and the television set (Step 624). After the distance between the remote control and the television set is calculated, the remote control can determine whether it is within the transmission range of the infrared transceiver (e.g. >3 meters) in Step 625. If the remote control is within the infrared range of the television set, the remote control will select the infrared communication mode (Step 626). Otherwise, the remote control will select the radio frequency communication mode for communication between the remote control and the television (Step 627).

It should be pointed out that the above-discussed mode selection sequence can and should be repeated regularly. For example, one of the above-mentioned mode selection methods can be performed after each keystroke entry, but prior to the actual data or command transmission between the two devices, in order to ensure the most appropriate communication mode is adopted for the communication between the remote control and the television.

4. EPG Programming Data

Another aspect of the present invention is a method of providing television programming guide information (e.g. the EPG data) to the remote control so that the remote control (1) can provide the programming guide information to the user using the user interface; and/or (2) can process user commands/data and then parse and retrieve the EPG programming data stored in the remote control for any relevant information so that appropriate controlling signals can be produced to activate the television sets and/or other AV devices accordingly. As discussed in the previous paragraphs, each of the television set and the remote control comprises at least one transceiver (e.g. infrared transceiver or radio frequency transceiver) for exchanging information between the remote control and the television set.

Particularly, according to this aspect of the present invention, the television set is first provided with the EPG information from the television signal received from either the cable company or baseband RF transmission. After the television set receives this information, the television set transmits this information to the remote control through a communication channel established between the television set and the remote control (e.g. infrared communication or radio frequency communication). After receiving this information from the television set, the remote control organizes and stores this information in the remote control memory for later use.

For example, this EPG information may contain daily or weekly TV programming schedule and channel assignments. Preferably, each of the program entries comprises the (1) TV channel number; (2) show time; (3) show name; and (4) synopsis of each program. Depending on the size of the remote control memory, the remote control can store this information of all the scheduled TV programming for one day, or even one week or more. By having all the EPG programming information stored in the remote control memory, the remote control can accommodate different modes of data entry, such as accepting command input using channel number, program name, or keywords. Since all related information of each television program is stored in the remote control memory, the channel number and the program name can then be retrieved by the controller of the remote control by parsing the EPG data stored in the remote control memory.

For example, when requested by the user, the remote control can display any portion of the TV programming schedule for the night, or the week on its user interface. In this case, all or a portion of the program names, show times, and synopsis etc. can be shown for any specified time period on the user interface of the remote control. Furthermore, another feature is to allow the user to find out which channel a specific program will be showing, and at what time.

For example, FIG. 8a shows a remote control having a TV program named "Seinfeld" handwritten on its screen by a user. By employing handwriting recognition software installed in the remote control, the handwritten word "Seinfeld" can be recognized and the corresponding commands/data can be extracted. In the present example as shown, the remote control first captures the handwritten program name "Seinfeld" and then translates it into a machine-readable format (e.g. ASCII data). Then, the remote control parses the EPG programming information stored in the remote control memory and retrieves the corresponding programming guide information so that the programming listing for the program "Seinfeld" can be accessed and processed. After the corresponding information is obtained and processed, all or a portion of the programming guide information of the TV program "Seinfeld" can be listed on the user interface (e.g. touch screen).

FIG. 8b shows the remote control of the preferred embodiment displaying the programming guide information for the TV program "Seinfeld." Depending on the user interface design, all or a portion of the programming guide information stored in the remote control memory can be displayed on the screen. In the example as shown in FIG. 8b, under the TV program name "Seinfeld," the corresponding channel number and show time are displayed on the same screen. In one preferred embodiment of the present invention, the user can then be prompted by the remote control to determine whether the corresponding TV program should be activated and shown on the television at the future show time. On the other hand, if the TV program Seinfeld is currently being shown on one of the TV channels, the remote control can send the appropriate control signals to the television set and switch the television set to the corresponding channel. Furthermore, if selected by the user, the VCR connected to the remote control system can also be programmed so that the selected TV program will be recorded by the VCR at the future show time.

5. Soft Graphical User Interface (Soft GUI)

Another aspect of the present invention is a novel user interface provided by the universal remote control. This aspect of the present invention is illustrated by FIGS. 9a,9b. According to the present invention, soft graphical user interface ("Soft GUI") can provide maximum flexibility for the user to interface with the remote control. The soft GUI can also provide a user-friendly interface for the user to acquire control of different functional components accessible by the remote control. For the remote control system as shown in FIG. 2, the remote control can communicate and operate with all consumer electronic equipment having an IRDA interface. For example, the list can include stereo systems, VCR, DVD, computer peripherals, printers, and PCS, etc.

Under this aspect of the present invention, the soft GUI can display user familiar patterns on the screen of the remote control. Particularly, the user familiar patterns displayed on the user interface of the remote control emulate the control interface of any components connected to the remote control so that the user can issue commands by pressing the corresponding emulated buttons displayed on the screen. When any of the emulated buttons is pressed by the user, the remote control translates the user command to the corresponding control function. Then the remote control sends the corresponding control signals to the specified audio/video device(s).

For instance, FIG. 9a shows a remote control of the present invention having the word "VCR" handwritten on its display screen. In response to this written command, a handwriting recognition mechanism in the user interface analyzes and converts the handwriting "VCR" to machine-readable ASCII data. After that, the user interface calls up the VCR controlling subroutine store in the remote control memory and displays the VCR control buttons (e.g. Play, Forward, Backward, Record, and Pause, etc.) on the remote control display screen as shown in FIG. 9b. According to this aspect of the present invention, the user is then allowed to pick any of the VCR functions by pressing the corresponding button. For example, in the present example, the user can use a stylus to choose the "Play" function by pointing to the corresponding button on the display screen. Then the remote control converts the user input command to the corresponding control signals for activating the Play function of the VCR.

In another example, the user can use the remote control to program the VCR by selecting the date, time, and channel parameters displayed on the screen. In the remote control as shown in FIG. 9b, the buttons appeared on the display screen include day, month, and time, etc. of all the necessary parameters of a VCR programming command. The user can then program the VCR by simply pressing the corresponding buttons on the soft GUI screen of the remote control. Furthermore, the remote control can be designed so that when a television program is selected by the user, the remote control can provide the user with the television guide programming information of the selected television program along with this soft GUI screen so that the VCR can be programmed for the selected television program.

Another aspect under the soft GUI of the present invention provides a personalized remote control option for different users. Under this aspect of the present invention, the remote control can be programmed according to the preferences defined by different users. User-specific settings such as preferred channels, volume level on the television set and/or stereo set, etc. can be programmed and stored in the remote control memory. When this feature is activated, the remote control retrieves and executes these user-dependent settings according to the preference of the individual user. Furthermore, these individual settings can also be password protected.

For example, when a user activates his/her preferred settings stored in the remote control, the remote control can display a list of all preferred channels, and/or the past five television channels visited by the user so that the user can chose accordingly. Furthermore, other settings such as volume level control, balance control, and/or picture-in-picture controls can be similarly stored and recalled as user predefined settings by the user.

6. Expanding TV Functions

Another aspect of the present invention is the ability to expand the functions of the television set. Under this aspect of the present invention, the user can redefine the parameters of the television set using the user interface of the remote control. Specifically, instead of transmitting specific predefined commands (e.g. "Open PIP window for Channel 4") from the remote control to the television set, the remote control according to this aspect of the present invention provides a set of extensive control signals to the television set, or other AV devices. For example, the set of extensive control signals might include channel number, command of opening a PIP window, size of the PIP window, location of the PIP window, etc. Using these controlling signals, the television set can reformat the television screen accordingly. Thus, depending on the software program implemented in the remote control system, the remote control is able to expand the functionalities of the television set by adjusting the set of control parameters.

FIGS. 10a,b,c,d show a remote control system having a remote control and a television set 1020 coupled to the remote control 1010 according to this aspect of the present invention.

Referring to FIG. 10a, the remote control 1010 shows the channel number 6 on its display screen while the television set has the television programming set on channel 6. As shown in the figure, the display screen of the remote control has an emulated television screen where the user can issue commands onto the screen.

Referring to FIG. 10b, the user has issued a PIP command on channel 3 to the remote control by drawing a window and then writing a "3" onto the emulated television screen on the remote control 1010. The command is recognized by a handwriting recognition program stored in the remote control 1010. Then the remote control 1010 processes the PIP command and transmits a PIP command on channel 3 to the television set. It should be noted that the PIP command issued by the remote control to the television not only includes the conventional PIP instruction of opening a PIP window for showing channel 3. The command also includes the position and size of the PIP by analyzing the size and the position of the PIP window drawn on the emulated television screen of the remote control. Thus, the remote control sends the following parameters to the television set: instruction to create a PIP window, channel number of the PIP window, size of the PIP window, location of the PIP window, and accompanying audio(s) etc. Then the television set opens the PIP window on the television screen according to these parameters. This aspect of the invention provides the user full control of the PIP window screen by using the remote control.

FIG. 10c shows another feature of the present invention. Under this aspect of the present invention, the user is able to adjust the size of the PIP screen by simply resizing the PIP window on the simulated television screen as shown in the remote control using standard window management techniques. As shown in the figure, the corresponding PIP window on the television set 1020 is resized accordingly when the user adjusts the size of the PIP window on the simulated television screen on the remote control 1010 or, in another embodiment, on the on-screen display on the television set 1020.

FIG. 10d shows yet another feature of this aspect of the present invention. Under this aspect of the present invention, the user is able to move the location of the PIP window screen on the television screen by simply dragging the emulated PIP window on the remote control 1010, or on the on-screen display on the television set 1020. As shown in the figure, the PIP window on the television screen is positioned by the user to a new location when the emulated PIP window on the remote control 1010 is dragged to a different location. In response to the command to reposition the PIP window screen, the remote control issues the corresponding repositioning control signals to the television set by transmitting the new location and/or size of the PIP window as entered by the user. It should be noted that the same window management technique can be used with the remote control under this aspect of the invention.

It should be noted that, in the preferred embodiment according to the present invention, the above-mentioned window resizing and repositioning steps can be performed on the display screen using standard window management techniques. For example, the methods of resizing and repositioning Microsoft (™) windows can be similarly implemented in the remote control of the present invention.

Furthermore, the user can also create more than one PIP in the television screen by drawing another window on the emulated television screen on the remote control 1010. The remote control 1010 can then inform the television set 1020 to open another PIP screen according to the user command.

To better accommodate this feature, the television set needs to be able to accept the control signals provided by the remote control and change the screen characteristics accordingly. For example, the television set should be able to accept the controlling parameters such as the location and the size of the PIP window. Using these controlling parameters, the television can basically expand the television functions by, for example, performing the specific PIP window functions, etc. The television set is therefore, preferably, a digital signal processing television so that the video data of the TV screen can be digitally processed and rearranged. However, implementation of this invention is not limited to a digital television set because an analog television set having a digital signal processing ability is also able to implement this feature.

FIGS. 11a,11b,11c show another aspect of the expanding TV functions feature according to the present invention.

Referring to FIG. 11a, the remote control as shown displays an emulated television screen and six input control buttons. In this embodiment, each of the six input control buttons represents a television signal input source for the television set. According to this aspect of the present invention, the user is allowed to connect any of the six input control buttons to the emulated television screen displayed on the remote control so that the corresponding television input signal will be provided to the television set accordingly.

For example, as shown in the figure, the user can connect the video 2 input (i.e. VD2) to the television set by drawing a line from the button "VD2" to the emulated television screen displayed on the remote control. By drawing the connection from the button "VD2" to the emulated television screen, the remote control generates and sends a corresponding set of control signals to the television set to connect the VD2 input to the television set.

Referring to FIG. 11b, the remote control as shown displays an emulated television screen and two buttons representing two different aspect ratios. According to this aspect of the present invention, the user can change the aspect ratio of the television screen by drawing a line from one of the two buttons to the emulated television screen on the remote control. In the example as shown in the figure, the aspect ratio of the television screen can be changed to 16:9 by drawing a line from the "16:9" button to the emulated screen displayed on the remote control. The aspect ratio can also be changed by tapping the corresponding button on the emulated screen of the remote control. Furthermore, the aspect ratio of the television screen can be changed by the user by simply dragging the corner of the emulated screen on the remote control to a new aspect ratio. This method is similar to the window commands currently used with any window computer systems. Then, the remote control will generate and send the corresponding control signals to the television to execute this command.

Referring to FIG. 11c, the emulated television screen has an area for displaying closed captioning. According to this aspect of the present invention, the user can change the size, position, and/or characteristics of the closed captioning by simply dragging the closed captioning bar on the emulated television screen to other location. Then, the remote control will generate and send the corresponding control signals for changing the location of the closed captioning to the television set to execute this command.

It should be noted that the above-mentioned examples as shown in FIGS. 10a,b,c, and 11a,b,c demonstrate different methods of using a remote control to expand the controllability of the television set. According to this aspect of the present invention, the remote control can be programmed to perform different controlling functions not originally designed for the television set. By loading custom designed software into the remote control and the television, the functionabilities of the television set can be expanded, correspondingly.

8. Calibration Handshake

Another aspect of the present invention is to allow the user interface of the remote control to provide the current status information of the television set/set top box (and other AV devices connected to the remote control). In the conventional remote control system, the remote control is usually a dumb control having only a unidirectional communication means which cannot receive any status information from the devices connected to the remote control. For example, the remote control does not have the information of the volume level when the user is adjusting the volume level of the television set. This information (in this case, the volume level) can at most be provided on-screen by the television set because the conventional remote control does not carry any status information of the devices coupled. In other words, the devices connected are decoupled with the remote control.

According to this aspect of the invention, the audio/video device(s) coupled to the remote control regularly updates/provides its status information to the remote control using the bi-directional communication channel established between the remote control and the device(s). After the remote control receives and stores this status information, this information will be displayed on the user interface of the remote control when requested by the user. Then the user can control any portion of this status information by issuing corresponding commands to the user interface (e.g. graphically or intuitively) of the remote control. After processing these commands, the remote control will then transmit the corresponding control signal(s) to the specific audio/video device accordingly.

Under this aspect of the invention, the remote control stores and updates all, or selected portions, of the status parameters of the TV or any other audio/video devices connected to the remote control. These parameters might include, but are not limited to, the volume control of the TV and the stereo equipment, the brightness and sharpness of the TV, the program name of the TV program currently being shown on the TV, the balance control of the stereo system, and the time remaining on the DVD player, etc. This aspect of the present invention is illustrated by FIGS. 12a,b as follows.

FIG. 12a shows a remote control having handwriting characters "V TV" written onto its screen. The handwriting recognition mechanism of the user interface first recognizes and processes the handwriting command "V TV" and displays a volume control screen on the remote control. FIG. 12b shows the remote control having a volume control bar displayed on the screen. It should be pointed out that during power-on initiation of the television, the remote control is provided with the current control parameters or status of the television set. Thus, the remote control can provide the current volume control information of the television set when requested by the user. In the example as shown in FIG. 11b, the dot on the volume control bar indicates the current volume level of the television set. By simply dragging the dot to other position on the volume control bar, the remote control will execute the volume adjusting command by sending out a volume control signal to the television set.

The detailed operation of the calibration handshake can be illustrated as follows: After the user has given a "V TV" command on the remote control, the remote control sends a signal through its transceiver to the television set requesting current television status information. After receiving the request from the remote control, the television set provides all the volume control information to the remote control. The remote control then displays the current volume control information on its screen so that the user can control it using a stylus by dragging the dot representing the current volume level. The remote control then translates the user's command and sends the appropriate control signals to the television for adjusting the volume accordingly.

In another embodiment of the present invention, the parameters of all or a portion of the status information are stored in the remote control before any request from the remote control is made. In this embodiment, each of the connected components regularly transmits these parameters to the remote control to be stored in the remote control memory. Thus the remote control can provide the current status information instantly when requested.

It should be noted that this kind of calibration handshake can be applied to any of the functional parameters of the television set, or any other AV devices connected to the remote control, such as hue, brightness, channels, etc.

9. Passive Updating

Another aspect of the present invention is the ability to passively update the communication protocols and/or status parameters stored in the remote control. For example, the updating can be performed on the remote control for the EPG data stored, or the communication protocols used between the remote control and the television set/set top box and any other AV devices. In the preferred embodiment of the present invention, the television set of the remote control system is capable of passively and automatically updating any protocols and status parameters stored in the remote control. Depending on the implementations, the updating can be performed regularly (e.g. daily, or weekly), or when new protocol and data are received by the television set/set top box and the AV devices. In the preferred embodiment according to the present invention, for example, the remote control system can be programmed by the user on how often the updating procedure is performed. Before transmitting the updated information to the remote control, the television set or any of the connected AV devices first checks whether the remote control is within the communication range. For example, in the preferred embodiment, if the data communication between the remote control and the television set can be performed by the infrared transceivers only, the data updating of the remote control can only be performed when the remote control and the television set are within the infrared transmission range. On the other hand, if the data communication between the remote control and the television set is performed only by the radio frequency transceivers, the data transfer for updating the remote control is performed when the remote control and the television set are within the radio frequency transmission range. After the updated data is received by the remote control from the television set, the remote control updates its EPG or control protocols accordingly.

For example, the cable company can update the EPG programming information weekly by sending the information through its cable lines to the television set every week. Specifically, this information can be embedded in the vertical blanking interval ("VBI") portion or MPEG sub-picture data portion of the television signal. Furthermore, individual AV device manufacturers can also update the protocols of the AV devices by providing, for example, video cassettes embedded with updated protocols to the user. After the television set receives the information, the television set automatically sends the information to the remote control for updating the EPG programming data stored in the remote control memory so that the most updated TV programming schedules is stored in the remote control. Similarly, new communication protocol(s) for communicating with different A/V component(s) can also be sent by the television set to the remote control for updating the corresponding protocol(s) currently stored in the remote control.

In other instances, new functionalities can also be added to the television set by sending the corresponding control protocols of the new functions to the remote control. The detailed operation of adding new functionalities to the remote control is similar to the protocol updating as discussed above.

Similarly, any other AV device can send its own set of the communication protocol to the remote control for passively updating or initializing the remote control. The advantage of this feature is to eliminate manual updating and/or programming of the remote control.

10. Lost Beacon

Another aspect of the remote control system of the present invention is to incorporate a remote lost beacon in the remote control system. It is a common problem for the user to misplace the remote control somewhere in his or her house. Therefore, a remote lost beacon or a flashing LED feature is incorporated in the remote control system according to this aspect of the present invention. In the preferred embodiment, the same radio frequency transceiver in the television set can be used to provide a remote beacon signal to the remote control. When the user wants to locate the remote control, the user can simply press a button on the television set. Then the television set will send a remote control locator signal to the remote control. After receiving the remote control locator signal, a beeper in the remote control is activated and produces a sound to indicate the location of the remote control. In another embodiment, a flashing LED, instead of a beacon sound, can be used for indicating the location of the remote control.

11. Voice Recognition

Another aspect of the remote control of the present invention is to incorporate a voice recognition control option to the remote control. Instead of using the conventional push-button control, or the handwriting recognition technique as discussed in the previous paragraphs, a voice recognition mechanism can be implemented in the remote control for receiving voice information and/or commands from the user. There are currently various recognition mechanisms in the market, thus any one of the currently available voice recognition mechanisms can be implemented in the remote control according to the present invention. The voice recognition process is very similar to the handwriting recognition scheme as discussed, only with the substitution of the handwriting recognition mechanism with a voice recognition mechanism. The subsequent parsing of the EPG data is similarly implemented.

It should noted that all or portion of the above-mentioned features can be implemented in a remote control system according to the present invention. FIG. 13 is provided to show the operations of a remote control system using some of these features according to the present invention.

Step 1: A command is input to the remote control by an user. For illustration purpose, assuming the command issued is a "split-screen" command.

Step 2: The handwritten split-screen command is recognized and translated by a handwriting recognition mechanism of the remote control to a machine readable command (e.g. ASCII data as shown).

Step 3: A communication channel is selected by a proximity sensor so that the corresponding communication signals are sent through one of the two channels to the television set.

Step 4: The communication signals are received by the television set using one of the two transceivers (i.e. infrared transceiver and radio frequency transceiver).

Step 5: The received signals are then translated again to machine readable data for the television set to process.

Step 6: A central processing unit ("CPU"), or a digital television controller ("DTC") of the television set processes the commands and transmits the commands to the corresponding operating subsystem through an internal bus. Each of the subsystems A,B,C represents a different functional component of the television. For example, subsystem C is for controlling various screen orientations (e.g. aspect ratio or PIP, etc.) of the television set.

Step 7: The module C receives the split-screen command from the CPU through an internal bus and executes the command accordingly.

Step 8: A split screen is then displayed on the television set according to the command issued to the remote control.

Step 9: After the command is executed (i.e. a split screen is displayed as requested), an acknowledgment signal is generated by the subsystem C and provided to the internal bus.

Step 10: The acknowledgment signal is received by the CPU, or DTC connected to the internal bus.

Step 11: After a preferred communication channel is selected by the proximity sensor, the acknowledgment signal is transmitted to the remote control Step 12: The acknowledgment signal is received by one of the two transceivers of the remote control.

Step 13: The received signal is translated and processed by a controller of the remote control to generate a set of control signals to the display screen of the remote control.

Step 14: A representation such as a acknowledgment icon is displayed on the remote control to signal the "split screen command has been executed by the television set.

It is to be understood that while the invention has been described above in conjunction with preferred specific embodiments, the description and examples are intended to illustrate and not limit the scope of the invention, which is defined by the scope of the appended claims.

What is claimed is:

1. For controlling at least one audio/video device that is connectable to a source of programming including programming guide data, which reproduces received programming in audio and/or video form and which includes a wireless transceiver, a remote control, comprising:

a remote wireless transceiver for receiving the programming guide data from the transceiver of said at least one audio/video device and for transmitting commands to the transceiver of said at least one audio/video device to control the device's reproduction of audio and/or video programming;

a remote control memory coupled to said remote transceiver for storing the programming guide data received by the remote transceiver; and a user interface coupled to the remote control memory including a touch screen display device that displays at least a portion of the programming guide data stored in the remote control memory as selected by touching the display device, said user interface further including a handwriting recognition interface responsive to handwriting on the touch screen display to select the portion of the stored programming guide data that is displayed.

2. The remote control according to claim 1, wherein said user interface includes a voice recognition interface responsive to a voice input to select the portion of the stored programming guide data that is displayed.

3. The remote control according to claim 1, wherein said at least one audio/video device provides the programming guide data to the remote control whenever the television programming guide data is received by the audio/video device.

4. The remote control according to claim 1 is a programmable remote control.

5. A remote control system, comprising:
a television comprising a first transceiver, a data capturer for capturing television programming guide data from an input, and a display screen;
a remote control comprising a second transceiver for receiving the television programming guide data from the television, a remote control memory coupled to the second transceiver for storing said television programming guide data provided by the television, and a controller for retrieving at least a portion of the television programming guide data stored in the remote control memory, said second transceiver providing said at least a portion of the television programming guide data to the television through the first transceiver,
wherein said at least a portion of the television programming guide data is displayed by said display screen of the television from the remote control memory, and
a user interface comprising a touch screen display for displaying said at least a portion of the television programming guide data, said user interface further including a handwriting recognition interface responsive to handwriting on the touch screen display to select the portion of the stored programming guide data that is displayed.

6. A method for a remote control to communicate with at least one of a plurality of audio/video devices, wherein the remote control has a user interface, and each of the audio/video device performs a set of functions, comprising:
storing, in a memory of the remote control, data for a display of a set of control buttons of each of the plurality of different audio/video devices,
selecting at least one of the plurality of audio/video devices using the interface of the remote control;
displaying a set of control buttons on said user interface of said remote control from the data stored in the memory of the remote control, each of the control buttons corresponding to at least one of the functions performed by the selected audio/video device,
said user interface comprising a pressure sensitive touch screen display for displaying the set of control buttons, wherein each of the buttons can be actuated by touch, and a handwriting recognition interface, wherein handwriting occurs on the touch screen to select at least one of the audio/video devices;
activating one of the functions of the selected audio/video device by actuating the corresponding button on said user interface of said remote control, the activating comprising:
pushing the corresponding button on the user interface of said remote control;
generating a set of control signals for the selected audio/video device of the activated function; and
transmitting the set of control signals to the selected audio/video device to activate the corresponding function.

7. A method for a remote control to communicate with an audio/video device, said remote control comprising a user interface, and said audio/video device comprising a plurality of controlling components, wherein each of the controlling components is set at a controlling level, comprising:
selecting one of the controlling components of the audio/video device;
transmitting the corresponding controlling level of the selected controlling component from the audio/video device to the remote control;
displaying the selected controlling level on the user interface;
adjusting the selected controlling level using the user interface; and
transmitting the adjusted controlling level from the remote control to the audio/video device to adjust the corresponding component of the audio/video device.

8. The method according to claim 7, wherein said remote control comprises a user interface comprising a touch screen display.

9. The method according to claim 7, wherein said remote control comprises a user interface comprising a handwriting recognition mechanism.

10. The method according to claim 7, wherein said remote control comprises a user interface comprising a voice recognition mechanism.

11. A method for a remote control to communicate with an audio/video device, said remote control comprising a user interface, and said audio/video device comprising a plurality of controlling components, wherein each of the controlling components is set at a controlling level, comprising:
selecting one of the controlling components of the audio/video device;
transmitting the corresponding controlling level of the selected controlling component from the audio/video device to the remote control;
storing the selected controlling level in a memory of the remote control;
displaying the selected controlling level on the user interface;
adjusting the selected controlling level using the user interface; and
transmitting the adjusted controlling level to the audio/video device to adjust the corresponding component of the audio/video device.

12. The method according to claim 11, wherein said remote control comprises a user interface comprising a touch screen display.

13. The method according to claim 11, wherein said remote control comprises a user interface comprising a handwriting recognition mechanism.

14. The method according to claim 11, wherein said remote control comprises a user interface comprising a voice recognition mechanism.

15. A method, method for a remote control to adjust the display properties of a screen of a television, said remote control including a user interface, comprising:

issuing a display control command on the user interface of the remote control for adjusting the display properties of the television screen, said display control command being a picture-in-picture command;

analyzing the display control command by the remote control;

translating the display control command to a set of controlling parameters, wherein said controlling parameters are fully controllable by the remote control, and wherein said set of controlling parameters comprise size and location of a picture-in-picture window screen in the television screen;

transmitting the controlling parameters from the remote control to the television; and displaying the television screen with its display properties adjusted according to the controlling parameters;

wherein said user interface of the remote control comprises a display screen, and wherein said display screen comprises an emulated picture-in-picture window corresponding to the picture-in-picture window screen.

16. A method for a remote control to create a picture-in-picture window screen in a television screen of a television, said remote control comprising a user interface, comprising:

issuing a picture-in-picture command on the user interface of the remote control;

analyzing the picture-in-picture command by the remote control;

translating the picture-in-picture command to a set of controlling parameters, wherein said controlling parameters comprise size and location of the picture-in-picture window screen, and said size and location of the picture-in-picture window screen are fully controllable by the remote control;

transmitting the controlling parameters from the remote control to the television;

creating the picture-in-picture window screen on the television screen according to the controlling parameters; and wherein said user interface of the remote control comprises a display screen, and wherein said display screen comprises an emulated picture-in-picture window corresponding to the picture-in-picture window screen.

17. The method according to claim 16 further comprising:

adjusting the size of the emulated picture-in-picture window on the user interface of the remote control;

analyzing the adjustment of the emulated picture-in-picture window in the remote control;

translating the adjustment to a second set of controlling parameters, wherein said second set of controlling parameters comprises an adjusted size of the picture-in-picture window screen;

transmitting said second set of controlling parameters from the remote control to the television; and adjusting the picture-in-picture window screen on the television screen according to the second set of controlling parameters.

18. The method according to claim 17 further comprising:

adjusting the position of the emulated picture-in-picture window on the user interface of the remote control;

analyzing the adjustment of the emulated picture-in-picture window in the remote control;

translating the adjustment to a second set of controlling parameters, wherein said second set of controlling parameters comprises an adjusted size of the picture-in-picture window screen;

transmitting said second set of controlling parameters from the remote control to the television; and adjusting the picture-in-picture window screen on the television screen according to the second set of controlling parameters.

19. The method according to claim 16 further comprising:

adjusting the channel of the emulated picture-in-picture window on the user interface of the remote control;

analyzing the adjustment of the emulated picture-in-picture window in the remote control;

translating the adjustment to a second set of controlling parameters, wherein said second set of controlling parameters comprises an adjusted size of the picture-in-picture window screen;

transmitting said second set of controlling parameters from the remote control to the television; and adjusting the picture-in-picture window screen on the television screen according to the second set of controlling parameters.

20. The method according to claim 16, wherein said emulated picture-in-picture window display a video capture of the picture-in-picture window screen on the television screen.

21. The method according to claim 16, wherein multiple picture-in-picture window screens can be created on the television screen.

22. The method according to claim 16, wherein said user interface of the remote control comprises a handwriting recognition mechanism.

23. The method according to claim 16, wherein said user interface of the remote control comprises a voice recognition mechanism.

* * * * *